US007283379B2

(12) United States Patent
Baker et al.

(10) Patent No.: US 7,283,379 B2
(45) Date of Patent: Oct. 16, 2007

(54) CURRENT CONTROLLED SWITCH MODE POWER SUPPLY

(75) Inventors: Eric Matthew Baker, Elkhart, IN (US); Sergio Busquets-Monge, Barcelona (ES); Gerald R. Stanley, Mishawaka, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 65 days.

(21) Appl. No.: 11/325,164

(22) Filed: Jan. 4, 2006

(65) Prior Publication Data

US 2006/0152947 A1 Jul. 13, 2006

Related U.S. Application Data

(60) Provisional application No. 60/642,214, filed on Jan. 7, 2005.

(51) Int. Cl.
 *H02M 7/219* (2006.01)
 *H02M 1/42* (2006.01)
(52) U.S. Cl. .......................................... 363/98; 363/17
(58) Field of Classification Search ............ 363/15–17, 363/98, 131, 132
 See application file for complete search history.

(56) References Cited

U.S. PATENT DOCUMENTS

| 4,674,025 | A | 6/1987 | Edwards ....................... 363/71 |
| 5,991,169 | A * | 11/1999 | Kooken ........................ 363/17 |
| 6,246,599 | B1 | 6/2001 | Jang et al. ................... 363/132 |
| 6,392,902 | B1 * | 5/2002 | Jang et al. .................... 363/17 |
| 6,803,730 | B2 | 10/2004 | Nadd et al. ............. 315/209 R |
| 6,862,195 | B2 * | 3/2005 | Jitaru .......................... 363/17 |

FOREIGN PATENT DOCUMENTS

DE 100 44 574 A 1 3/2001

OTHER PUBLICATIONS

English Translation of Foreign Patent Document DE 100 44 574 A1, 4 pages.*
Khaled Laouamri, Jean-Paul Ferrieux, Stéphane Catellani, and Jean Barbaroux, Modeling and Analysis of Wound Integrated LCT Structure for Single Stage Resonant PFC Rectifier, IEEE Transactions On Power Electronics, vol. 18, No. 1, Jan. 2003.

(Continued)

*Primary Examiner*—Gary L. Laxton
(74) *Attorney, Agent, or Firm*—Brinks Hofer Gilson & Lione

(57) ABSTRACT

A single stage switch mode power converter receives a supply line voltage and a supply line current from a power supply line, and provides one or more regulated output voltages for a load, such as an amplifier. The power converter is operable to regulate the output voltage(s) using a controller that includes a voltage controlled current loop. The controller can enable substantially constant supply line current to be drawn from the power supply line by selectively allowing conduction of the supply line current through the power converter. A power factor of the supply line voltage and the supply line current may be optimized by the controller at medium to high power levels thereby maximizing the power provided to the switch mode power converter from the power supply line. Due to the adaptive nature of the controller, the power converter can operate over a wide range of supply line voltage.

44 Claims, 11 Drawing Sheets

OTHER PUBLICATIONS

Juan A. Sabaté, Student Member, IEEE, and Fred C.Y. Lee, Fellow, IEEE, Off-Line Application of the Fixed-Frequency Clamped-Mode Series Resonant Converter, IEEE Transactions On Power Electronics, vol. 6, No. 1, Jan. 1991.

José M. Burdio, Francisco Canales, Peter M. Barbosa, and Fred C. Lee, Comparison of Fixed-Frequency Control Strategies for ZVS DC/DC Series Resonant Converters, Center for Power Electronics Systems, The Bradley Department of Electrical and Computer Engineering, Virginia Polytechnic Institute and State University, Blacksburg, VA 24061, USA.

* cited by examiner

CURRENT CONTROLLED SWITCH MODE POWER SUPPLY

PRIORITY CLAIM

This application claims the benefit of priority from U.S. Provisional Application No. 60/642,214, filed Jan. 7, 2005, which is incorporated by reference.

BACKGROUND OF THE INVENTION

1. Technical Field

The invention generally relates to switch mode power supplies. More particularly, the invention relates to switch mode power supplies that are current controlled to maintain a substantially constant line current at an optimized power factor.

2. Related Art

As the power capability of a power converter, or power supply, grows, the need to better utilize the power source follows close behind. The distribution of power throughout the world has coalesced on a sinusoidal AC network leading to the advent of power factor corrected processing. Prior developed power factor correction or PFC stages have used a two-stage boost based converter, or a single stage converter to achieve the voltage requirements for a load on the power supply and to achieve galvanic isolation.

In prior art PFC stages, the line current supplied is subject to substantial changes in magnitude due to the sinusoidal nature of the line voltage and current and a typically varying load. In order to achieve unity power factor, the peak current should occur substantially in phase with the peak voltage. As a result, the PFC stage switches the highest current and the highest voltage at the same time. Due to the high magnitude of current drawn during peak and valley voltages, the number and/or robustness of the switching devices are increased. In addition, higher stresses on the switching devices may be experienced during operation. These factors tend to increase cost, reduce longevity and reduce overall efficiency of the power converter. Overall efficiency can be compromised by energy loss and accompanying buildup of heat that accompanies such high magnitude current and voltage switching.

SUMMARY

The present invention includes a power converter (or power supply) that is a single stage power converter configured to combine power factor correction and galvanic isolation in a single stage. The power converter includes sets of switches that may be controlled to maintain a substantially constant line current from a power line, such as an AC line, supplying the power converter. In addition, the power converter may optimize the power factor of the power converter. Instead of focusing on achievement of a unity power factor, the power converter may beneficially operate to control the shape of the current imposed on the power supply line. This may allow the capability to achieve nearly unity power factor as well as reduce device stress in devices operating in the power converter. As a result, less heat may be produced and the number of parallel devices employed in the power converter may be reduced.

The power converter may be a single stage capable of producing relatively high power output, such as greater than 10 kW. In addition, the power converter can accept a line voltage as an input voltage in a predetermined range, such as anywhere between about 85 to about 277 volts. The power converter can also provide power factor correction using a series-resonant phase shifted full bridge clamped-mode topology. In one example, the power converter may be included with an audio amplifier to supply power to one or more power supply rails within the audio amplifier. Accordingly, the power converter can be subject to a constantly varying load as the audio signal being amplified by the audio amplifier varies.

These and other systems, methods, features and advantages of the invention will be, or will become, apparent to one with skill in the art upon examination of the following figures and detailed description. It is intended that all such additional systems, methods, features and advantages be included within the description, and be within the scope of the invention.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
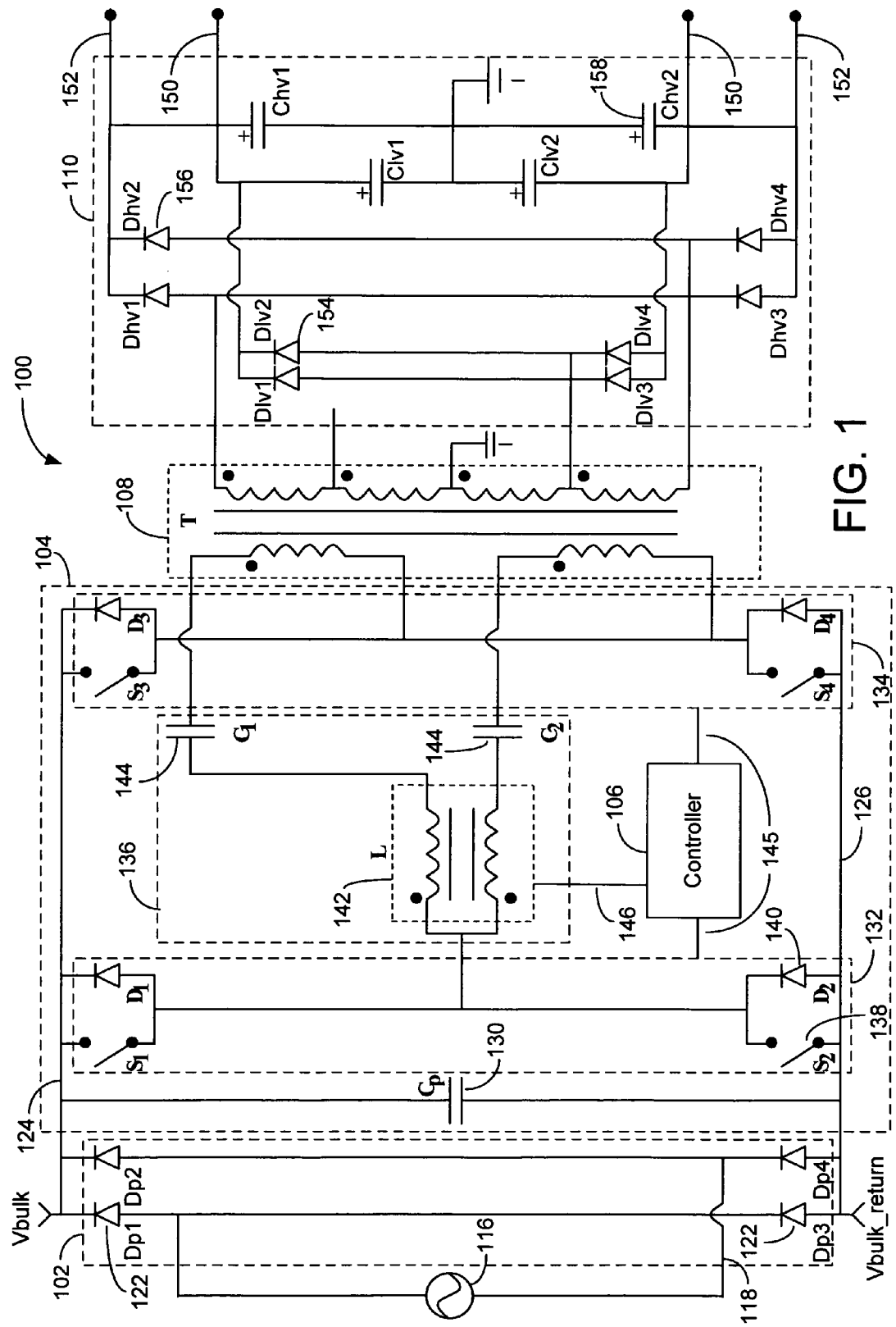
FIG. 1 is an example circuit diagram of a power converter.

FIG. 1 is a simplified circuit schematic of an example power processing stage of a power converter 100. The power converter 100 includes an input rectifier 102, a switching stage 104, a controller 106, a transformer 108, and an output rectifier 110 that includes associated storage capacitance. In other examples, other configurations of power processing stages that are capable of providing switched mode power conversion are possible.

In FIG. 1, power processing begins with a supply line input voltage and a supply line input current provided by a power source 116, such as an AC power source provided by an electricity supply company, on a supply line 118. In some examples, the AC power source may include electromagnetic interference (EMI) filtering capabilities, such as with an EMI line filter. The line input voltage may be full-bridge rectified by the input rectifier 102. The input rectifier 102 may be any system or device capable of rectifying an AC voltage. The example input rectifier 102 is a full bridge rectifier that includes a plurality of diodes 122 identified as ($D_{p1}$-$D_{p4}$) connected in a bridge. In this configuration, each half cycle of a sinusoidal wave is rectified by a pair of diodes that are in opposite quarters of the bridge and in series with each other. The input rectifier 102 may rectify the line voltage on the power supply line 1118. In an alternative example, the power source 116 may be a DC power source. In this alternative example, the input rectifier 102 would be unnecessary. The rectified and filtered, or not, line voltage may be provided to the switching stage 104 as a bulk voltage (Vbulk) on a voltage supply line 124 and as a bulk voltage return (Vbulk_return) on a voltage return line 126.

The switching stage 104 includes a charge storage (Cp) 130, a first set of switches 132, a second set of switches 134, and a series resonance tank (SRT) 136. The charge storage (Cp) 130 may be one or more capacitors, such as a bank of film capacitors, or any other device capable of storing an electrical charge. In one example, the capacitance of charge storage (Cp) 130 may be relatively low, such as in the range of 1 microfarad to 100's of microfarads for varying loads on the power converter 100, such as loads present in audio amplifier applications. The relatively low capacitance of the charge storage (Cp) 130 may not be configured to store a great deal of energy during operation, but may be configured to create a high-current low impedance source of high frequency current for the power converter. Accordingly, during line current controlled operation of the power converter 100, line current drawn from the power supply line 118 may be stored in the charge storage (Cp) 130. The stored line current may be drawn from the charge storage (Cp) 130 as a supply current, such as a high frequency supply current, resulting in minimization of electromagnetic interference (EMI) on the power supply line 118.

The first and second switch sets 132 and 134 are formed in a single stage and may include a plurality of switches ($S_1$-$S_4$) 138 and a plurality of diodes ($D_1$-$D_4$) 140. As used herein, the term "single stage" is defined as a switching stage that includes only two sets of switches, where each set of switches includes only two switches. The switches ($S_1$-$S_4$) 138 may be any form of switching device, such as an insulated gate bipolar transistor (IGBT) or MOSFET. The diodes ($D_1$-$D_4$) 140 may be any device capable of antiparalleling operation and may be integrated into a device such as the body diode of a MOSFET. The first and second switch sets 132 and 134 may be configured to form a primary side full-bridge. In addition, the switches ($S_1$-$S_2$) 138 in the first switch set 132 and the switches ($S_3$-$S_4$) 138 in the second switch set 134 may each be configured as a first half bridge and a second half bridge, respectively. During operation, the first set of switches 132 may be operated to produce a first voltage output from the bulk voltage (Vbulk) on the voltage supply line 124 and the bulk voltage return (Vbulk_return) on the voltage return line 126. The second set of switches 134 may be independently but similarly operated to produce a second voltage output. Each of the first and second voltage outputs may be a switch-generated time variable magnitude of voltage with an associated switch generated current. The relative phase of the first and second sets of switches 132 and 134 may be varied such that a phase difference may be selectively created between the first and second voltage outputs. The first and second voltage outputs may be applied to the series connected SRT 136 and transformer 108.

The SRT 136 may be any device capable of filtering a voltage by acting as an interface between two voltage sources. In effect, the SRT 136 may act as a current source to generate a square wave output at a primary winding of the transformer 108. In FIG. 1, the example SRT 136 is constructed of an inductor (L) 142, such as a close coupled inductor, and a capacitor 144, such as the two banks of capacitors $C_1$ & $C_2$. The capacitor 144 may include multiple capacitors and the inductor (L) 142 may include two or more inductors that are close coupled to enable relatively high power throughput operation. In one example, the inductor (L) 142 may include multiple tightly coupled windings with substantially equal flux so that voltage and current flowing in the inductor (L) 142 and thus the transformer (T) 108 are shared substantially equally. In other examples, any other configuration of capacitance and inductance may be used to create the SRT 136. The switches ($S_1$-$S_2$) 138 may be coupled with the transformer (T) 108 through the SRT 136. As used herein, the terms "connected," "coupled" and "electrically coupled" are intended to broadly encompass both direct and/or indirect connections capable of conducting voltage and current between components and/or devices.

The controller 106 may be any circuit or device capable of switching the first and second sets of switches 132 and 134 with switching signals provided over switch control lines 145. The controller 106 may control the frequency and relative phase of the first and second sets of switches 132 and 134 to perform power factor correction and voltage regulation. Power factor correction and voltage regulation by the controller 106 may be based on a voltage signal sensed by the controller 106 on a voltage sensing line 146. The voltage may be sensed from the SRT 136 as described later.

The transformer (T) 108 may be any form or transformer providing a step change in voltage between one or more primary winding(s) and one or more secondary winding(s) included in the transformer (T) 108. For example, the transformer (T) 108 may be an isolation and step-up transformer with dual primary windings and low leakage. The transformer (T) 108 may provide one or more output voltages, and may be wound to provide paralleled interleave to better couple the primary winding(s) to the secondary winding(s). In FIG. 1, the transformer (T) 108 is configured to provide a dual set of output voltages on a secondary winding. The output voltages may be supplied on one or more power supply output rails, and may be fed into a regulation control scheme (not shown) included in the power converter 100. In the example power converter 100, the power supply output rails include a first power supply output rail 150 that is a low voltage DC rail and a second power supply output rail 152 that is a main DC rail. The first and second power supply output rails 150 and 152 may be derived from the output rectifier 110.

The output rectifier 110 may be a secondary side full bridge rectifier. In other examples, any other device or circuit may be used to rectify the output of the secondary side of the transformer (T) 108. In FIG. 1, the rectifier 110 includes a plurality of diodes ($D_{lv1}$-$D_{lv4}$) 154 connected in a bridge to form a low voltage full bridge rectifier and a plurality of diodes ($D_{hv1}$-$D_{hv4}$) 156 connected in a bridge to form a high voltage full bridge rectifier. Thus, a separate full bridge rectifier may supply rectified voltage to each of the first and second power supply rails 150 and 152. Each of the full bridge rectifiers may include capacitors ($C_{lv1}$-$C_{lv2}$ and $C_{hv1}$-$C_{hv2}$) 158 to provide high frequency filtering.

During operation, the switches (S1-S4) 138 may be directed by the controller 106 to turn on and off in a manner that maintains a substantially constant supply of line current from the power supply line 118. In addition, the switching of the switches (S1-S4) 138 may be controlled by the controller 106 to optimize the power factor of the power converter 100 by controlling the shape of the waveform of the line current imposed on the power supply line 118. More specifically, the controller 106 may selectively operate the switches (S1-S4) 138 to flatten or clip the peak portions of line current by enabling the generation of a square wave current and a primary voltage that is controlled to a conduction voltage. The square wave current and the primary voltage may be generated with the first and second voltage outputs from the respective first and second sets of switches 132 and 134. Thus, in the case of an AC line current, the controller 106 may operate to purposefully "distort" the sinusoidal waveform of the line current to avoid imposing on the power supply line 118 what would otherwise be peak currents of the sinusoidal wave of the line current. By controlling the shape of the line current waveform, nearly unity power factor may be achieved. In addition, due to the lower peak current, device stress in devices operating in the power converter 100 may be reduced.

Unity power factor maximizes efficiency of the power consumed by a load. In order to best use the full potential of an AC line having a line voltage and a line current, while minimizing distortion caused by a load, such as a power supply, connected to the AC line, an ideal load would be a resistive one. With a fully resistive load, the line current is in phase with the line voltage and harmonic content is determined by a fundamental frequency of the line voltage. Power factor is determined by the ratio of the real power to the product of the RMS voltage and RMS current consumed by a load. With a resistive load, this leads to a value of unity. Most conventional power supplies with a simple transformer/rectifier combination have effective power factors in the 0.6-0.7 range; hence the AC line is called to deliver a larger RMS current than is actually ideally necessary to meet the power demands of a power supply and any load supplied thereby.

Figure 2:
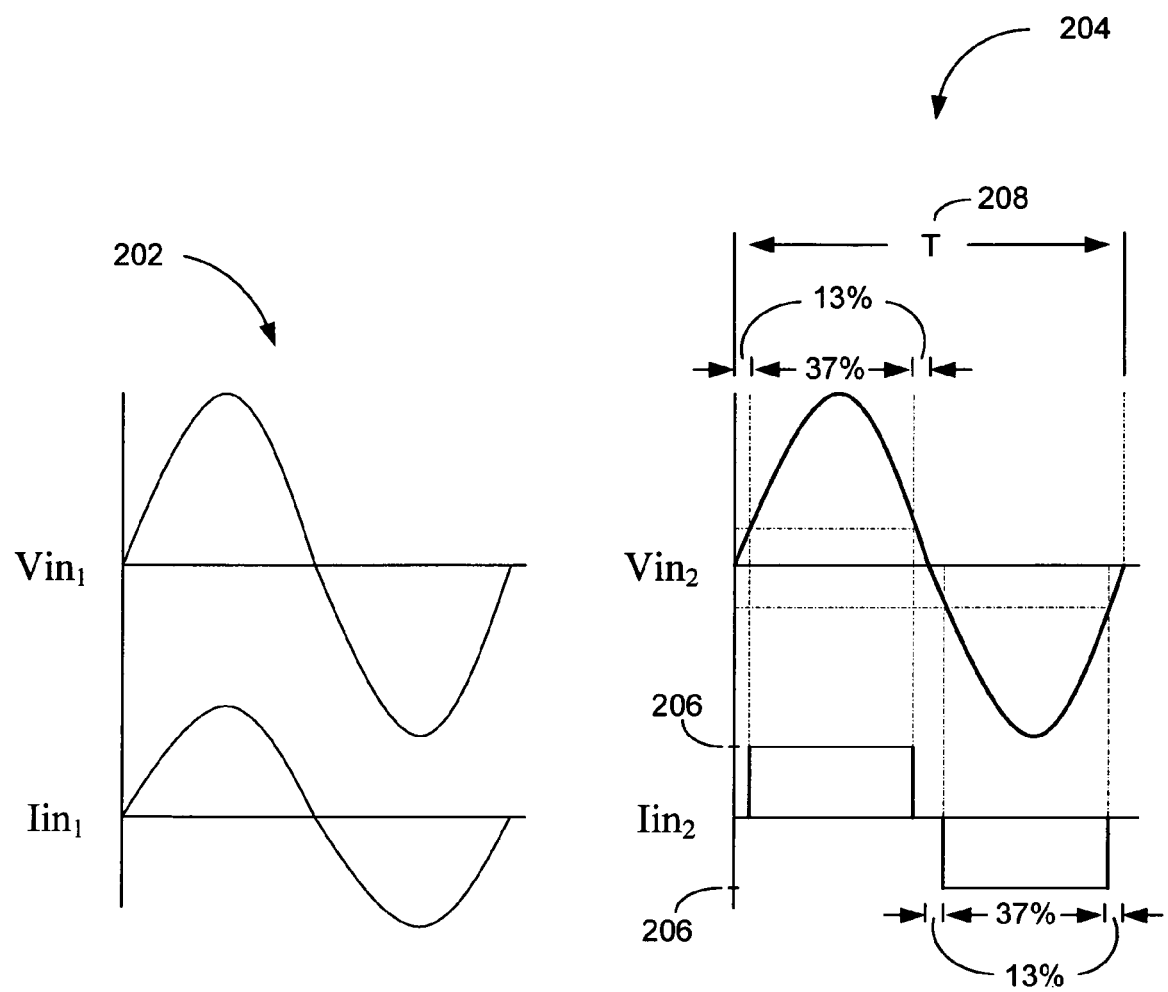
FIG. 2 is graph illustrating unity power factor and an example of power factor correction with the power converter of FIG. 1.

FIG. 2 depicts a first graph 202 that shows an ideal power factor for an AC power source and a second graph 204 that shows a power factor generated, for example, with the power converter 100 using an AC power source. The first graph 202 includes a line voltage ($Vin_1$) that is in phase with a line current ($Iin_1$), such as could occur with a purely resistive load. The second graph 202 includes a line voltage ($Vin_2$) and a line current ($Iin_2$) that is a nearly constant line current and has a square wave shaped current waveform. The square wave shaped current waveform ($Iin_2$) may be generated by the power converter 100 at the same frequency and duty cycle as the power supply line. If the time during which the power converter 100 draws current from the power supply line is defined as "d", then an expression for the power factor PF(d) of the second graph 204 can be expressed as:

$$PF(d) := \frac{\frac{2}{\pi} \cdot \cos\left[\frac{\pi}{2} \cdot (1 - 2 \cdot d)\right]}{\sqrt{d}} \quad \text{EQUATION 1}$$

The derivative with respect to duty cycle of the line current ($Iin_2$) may be used to find the maximum power factor. Accordingly, an optimum line current ($Iin_2$) may be determined at a certain power factor. In the example second graph 204, the optimum power factor one can achieve may occur when the duty cycle of the square wave shaped current waveform ($Iin_2$) nears 0.371 (or 37% of the possible 50% available duty cycle of the line current ($Iin_2$)) with a theoretical power factor of about 0.961. Accordingly, in the second graph 204, the line current is conducting during 37% of a positive portion of the line current duty cycle and not conducting during the remaining 13%. Similarly, the line current ($Iin_2$) may also be conducting during 37% of a negative portion of the line current duty cycle and not conducting during the remaining 13%. The power factor of such a line current remains desirably close to unity and allows optimum power supply switch utilization and regulation in a single stage of power processing. In other examples, other line current duty cycles and corresponding power factors are possible.

In this example, 120 Vac was chosen as the line voltage ($Vin_2$) for which the power factor would be maximum. In other examples, any other magnitude of voltage may be chosen. The greatest line current occurs at the lowest operating voltage for a given power level, thus the greatest benefit for high power factor also occurs at the lowest operating voltage. To maximize the power factor in the 120 Vac example, conduction of the constant current waveform ($Iin_2$) may be selected to begin at a conduction voltage of approximately 67V, which in this example, is the lowest anticipated operating voltage. Taking into consideration losses, such as circuitry losses, the design point may be selected to be about 60V in order to ensure conduction at 67V.

Accordingly, the power converter 100 may be designed to begin conducting and induce the flow of line current ($Iin_2$) through the power converter 100 when the sinusoidal waveform of the voltage is at or above 60V. Thus, the transformer (T) 108 may be designed with a turns ratio of the primary winding and the secondary winding so that a reflected voltage of the secondary winding is about equal to the conduction voltage. In other examples other lowest projected operating voltages and corresponding magnitudes of reflected voltage may be chosen, and conduction of the constant current waveform ($Iin_2$) may occur at different conduction voltages.

In FIG. 2, the line current ($Iin_2$) 204 is a square shaped current waveform with a peak current 206. The line current ($Iin_2$) 204 can be substantially constant within each half of a time interval (T) 208 during the time when the line current ($Iin_2$) 204 is being drawn (conducting) from the power supply line 118 (FIG. 1). During operation with the power converter 100, both the onset of conduction, and termination of conduction of the line current ($Iin_2$) 204 may include rounded edges due primarily to non-zero throughput impedances. In addition, there may be some variation in the magnitude of the magnitude of the line current ($Iin_2$) 204 during conduction due to source variation, load variation, and/or control loop speed. Thus, during conduction, the line current ($Iin_2$) 204 is a substantially constant current that attempts to achieve the ideal square wave shape depicted in FIG. 2 but falls short due to the aforementioned constraints. As such, the term "substantially constant current" or "substantially constant line current" is defined herein as when the line current ($Iin_2$) 204 reaches at least about 90% of a maximum during an alternating current half-cycle, and varies by no more then about 15% from the at least 90% of the maximum within one-half of the alternating current half-cycle or one-quarter of the time interval (T) 208.

Figure 3:
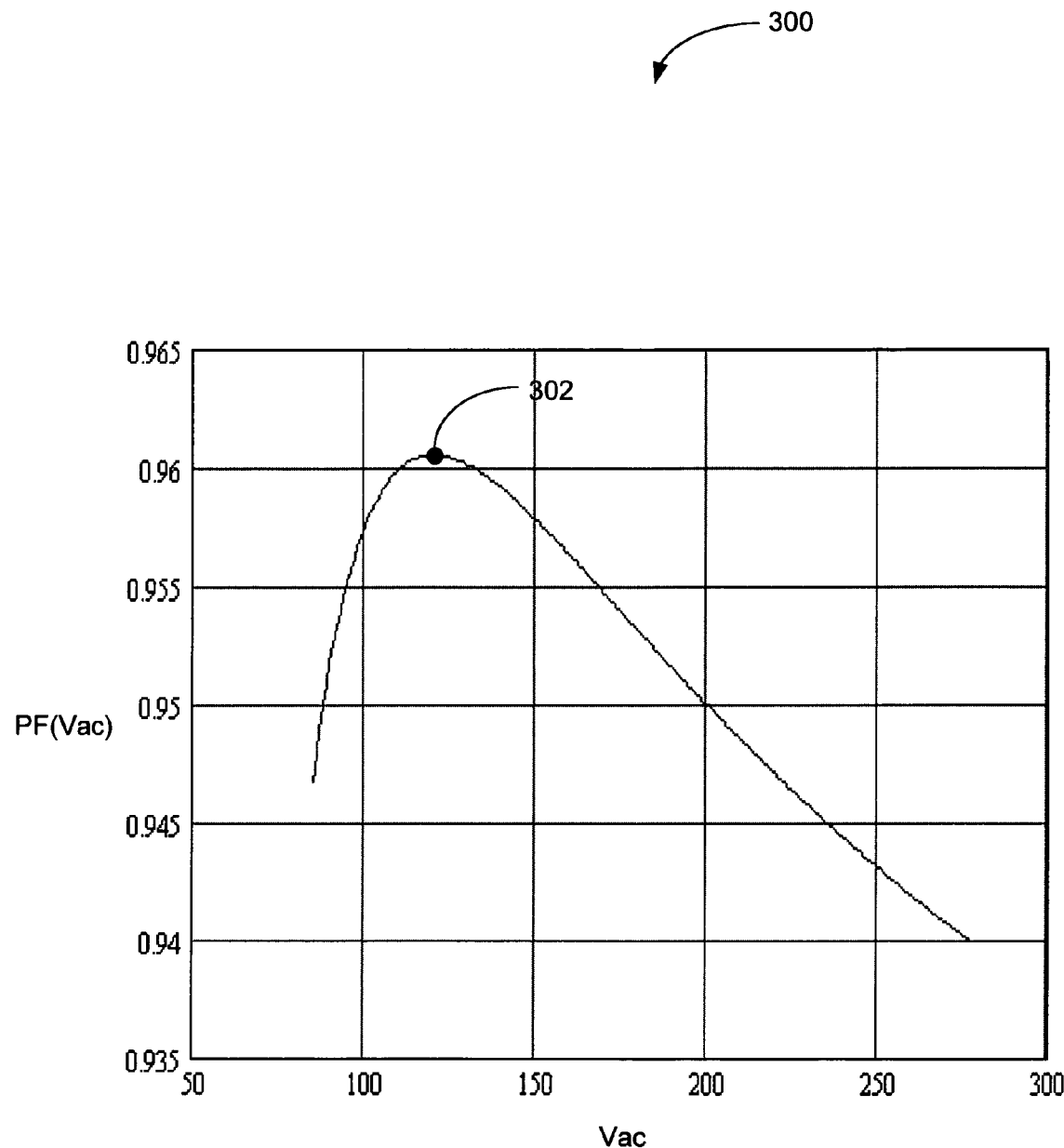
FIG. 3 is a graph of an example of power factor versus AC input voltage for the power converter of FIG. 1.

FIG. 3 is an example graph 300 of power factor vs. line voltage ($Vin_2$) for the example selected line voltage ($Vin_2$) of 120 Vac. In other examples, plots similar to FIG. 3 may be depicted to illustrate other magnitudes of line voltage and corresponding maximum power factor points. As the line voltage ($Vin_2$) varies on either side of a selected maximum power factor point 302, the power factor may fall off. The power converter 100 may be operated to optimize the power factor within a particular region, such as the region of the lowest anticipated operating voltage (the conduction voltage), while operating with a lesser power factor elsewhere where stresses in the devices of the power converter 100 are less. Accordingly, stresses associated with high current may be avoided thereby reducing heating in the die of devices included in the power converter 100. In addition, due to lowered stresses, fewer components may be employed in the power converter.

Phase Shift Modulation

In FIG. 1, phase-shift modulation may be used to control the first and second sets of switches 132 and 134. During operation, one of the first and second sets of switches 132 and 134 may be a leading leg, and the other set of switches 134 may be a lagging leg. For example, where the first and second set of switches 132 and 134 form a full-bridge, the first set of switches 132 may be operated by the controller 106 to be a leading leg, or rotating half bridge of the full bridge, and the second set of switches 134 may be a lagging leg, or static half-bridge, of the full-bridge.

As previously discussed, the first set of switches 132 and the second set of switches 134 may be connected differentially between the bulk voltage (Vbulk) on the voltage supply line 124 and the bulk voltage return (Vbulk_return) on the voltage return line 126. During operation, the switches (S1-S4) 138 may be directed by the controller 106 to turn on and off in such a way, that a quasi-square wave voltage (the conduction voltage) is generated across the series connected SRT 136 and transformer 108. As described later, the quasi-square wave voltage is filtered by the SRT 136 to generate a square wave voltage of magnitude equal to the reflected voltage on the primary of the transformer (T) 108. The magnitude of a fundamental of the square wave voltage may be controlled by the controller 106 to be equal to or greater than the conduction voltage.

The switching of the switches (S1-S4) 138 may determine the frequency of the square wave voltage. The controller 106 may include a clock, or any other timing mechanism, operating at a predetermined frequency, such as 40 kHz. Using the clock, the controller 106 may control the switching frequency and thus the frequency of the square wave voltage that is generated. In other examples, the switching frequency may be variable instead of fixed.

Figure 4:
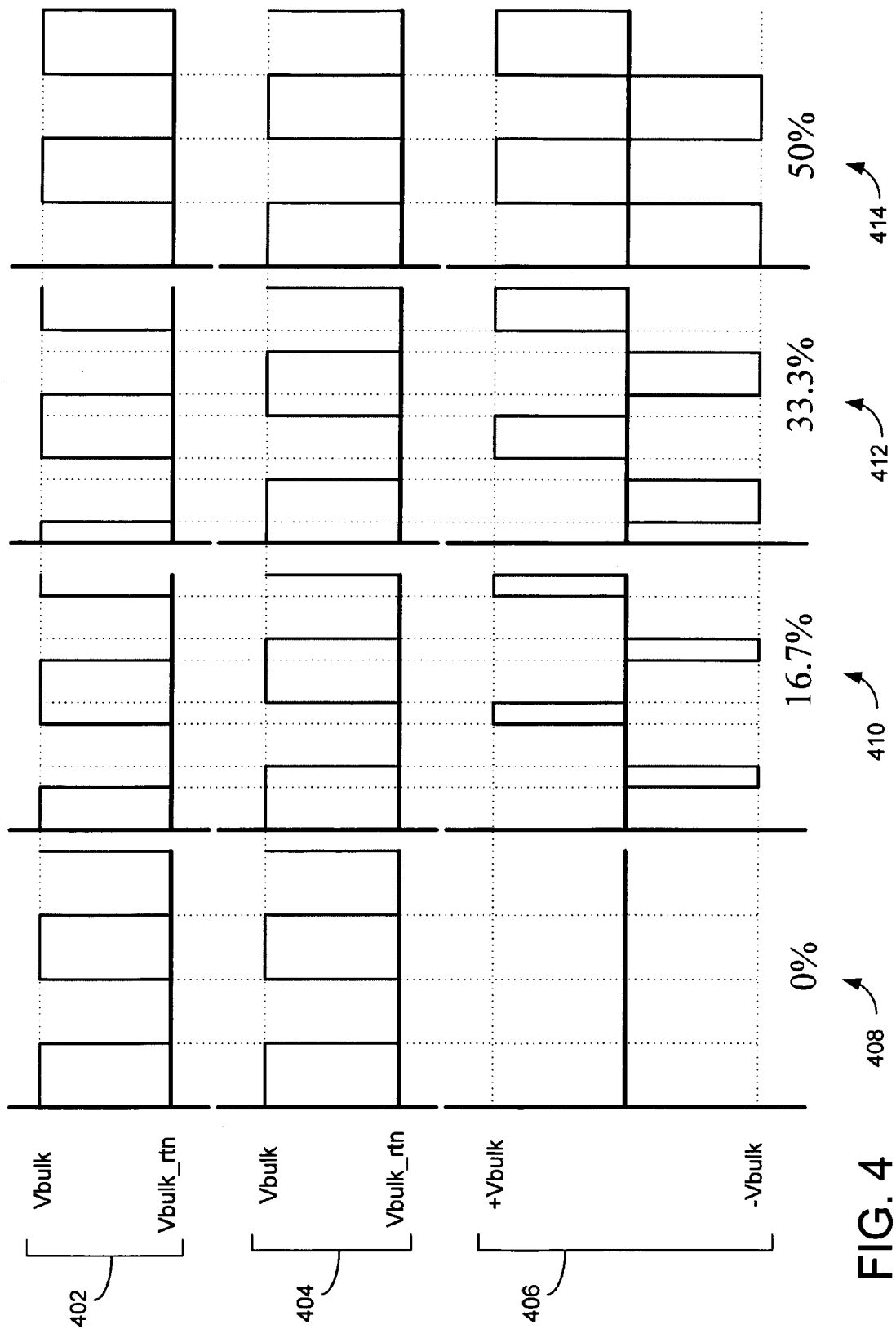
FIG. 4 is a graph of example phase shift modulations for the power converter of FIG. 1.

FIG. 4 is an example graph 400 depicting the first voltage output 402 of the first set of switches 132, the second voltage output 404 of the second set of switches 134, and a differential voltage 406 representative of the combination of the first and second voltage outputs 406 received by the SRT 136. The filtered differential voltage 406 forms a primary voltage that is received at the primary of the transformer (T) 108. Over a switching cycle of either of the first or second set of switches 132 or 134, a 50% duty cycle square wave could be observed for the respective first or second voltage outputs 402 and 404. By varying the relative phase of these 50% duty cycle square waves, the effective duty cycle of the differential voltage 406, can range from 0% to 50% corresponding to the phase relationship of the first and second voltage outputs 402 and 404. As used herein, the term "relative phase" is defined to be the phase relationship between the periodic first and second voltage output signals generated by the respective first and second set of switches 132 and 134.

In FIG. 4, in a first column 408 the effective duty cycle of the differential voltage 406 is zero percent since the first and second voltage outputs 402 and 404 are in relative phase (zero degrees of phase difference). Thus the magnitude of the effective differential voltage 406 applied to the SRT 136 and subsequently to the transformer (T) 108 is substantially zero. In a second column 410, a third column 412, and a fourth column 414, the effective duty cycle of the differential voltage 406 has been increased to 16.7%, 33.3%, and 50%, respectively, due to a corresponding difference in the relative phase (or phase relationship) of the first voltage output 402 to the second voltage output 404. As a result, the fundamental amplitude of the quasi-square wave of the differential voltage 406 has increased in magnitude. When the effective duty cycle is 50% in column 414, the first and second voltage outputs 402 and 404 are 180 degrees out of relative phase and the differential voltage 406 is a square wave as illustrated. At other percentages, such as the 16.7% duty cycle and the 33.3% duty cycle illustrated in respective columns 410 and 412, the differential voltage 406 is a quasi-square wave. In other examples, other percentage increases in the effective duty cycle of the differential voltage 406 are possible.

Phase shift modulation may be used, in conjunction with the series resonant tank (SRT) 136, to provide a primary voltage to the transformer (T) 108 that is a square wave with a peak amplitude approximately equal to the predetermined conduction voltage. In the previously described example, the transformer primary conduction voltage threshold was a square wave with approximately a 60V peak amplitude. The primary voltage is provided to the primary winding of the transformer (T) 108 to induce the flow of the line current from the power supply line 118. Accordingly, the current flow induced by the primary voltage may shape the current drawn as the line current (the square wave current Iin2 of FIG. 2). As previously discussed, the conduction voltage must be greater in magnitude than the voltage reflected from the secondary of the transformer (T) 108 to the primary winding of transformer (T) 108 to induce the flow of line current in the secondary of transformer (T) 108.

During operation, as the line voltage varies, such as a 50-60 Hz sine wave that varies sinusoidally over each half cycle, the relative phase of the first and second voltage outputs 402 and 404 may be varied by the controller 106 with the respective first and second sets of switches 132 and 134 in an effort to maintain the primary voltage about equal to the conduction voltage. The relative phase of the first and second voltage outputs 402 and 404 may be varied by the controller 106 in order to achieve the desired shape of the line current by generating the necessary effective duty cycle of the differential voltage 406.

The effective duty cycle of the differential voltage 406 that is calculated by the controller 106 may also be based on a load placed on the power converter 100. The larger the measured voltage drop on the power supply output rail(s), when compared to a predetermined reference voltage(s), the larger the error signal generated with the controller 106, and thus the duty cycle of the first and second sets of switches 132 and 134 may be increased. In other words, as the load on the secondary of the transformer (T) 108 increases, the primary voltage on the primary winding of the transformer (T) 108 decreases, and more line current is drawn from the power supply line 108 to maintain the primary voltage of the transformer (T) 108 at the conductive voltage so that the line current continues to flow.

In FIG. 4, by adjusting the effective duty cycle of the differential voltage 406 to a higher percentage (such as from 16.7% to 33.3%) by adjustment of the relative phase of the first and second switches 132 and 134 with the controller 106, the conductive voltage of the primary of the transformer (T) 108 may be maintained as the secondary voltage of the transformer (T) 108 falls. Thus, line current continues to flow from the primary of the transformer (T) 108 to the secondary of the transformer (T) 108 and the secondary voltage is maintained. Similarly, as the secondary voltage of the transformer (T) 108 falls, the duty cycle of the first and second switches 132 and 134 may be adjusted by the controller 106 to lower the effective duty cycle of the differential voltage 406 (such as from 33.3% to 16.7%) to lower the conductive voltage of the primary of the transformer (T) 108.

Accordingly, during operation, the controller 106 may work to maintain the peak magnitude of the primary voltage at a predetermined magnitude (the conductive voltage), such as about 60 volts, based on the line voltage of the power supply line 118 and the power consumption of the load. The primary voltage may be maintained at the conduction voltage to regulate the power supplied to a load of the power converter 100. In the example of a load that is the power rails of an output stage of an audio amplifier, the load is varied almost constantly when audio is being amplified by the audio amplifier and thus the effective duty cycle may similarly constantly vary to maintain the peak amplitude of the primary voltage about equal to the predetermined conductive voltage.

Series Resonant Tank

In FIG. 1, the series resonant tank (SRT) 136 may be used in conjunction with the phase shift modulated first and second sets of switches 132 and 134 at a fixed frequency or a variable frequency. The basic function of the SRT 136 can be to average the duty cycle modulated quasi-square wave of the differential voltage 406 (FIG. 4) into a square wave of approximately the peak amplitude of the conduction voltage, such as approximately 60V peak amplitude. During operation, the SRT 136 may convert the quasi-square wave of the differential voltage 406 (FIG. 4) to the square wave provided to the primary of the transformer 108.

Conversion by the SRT 136 may involve filtering the quasi-square wave to limit the associated current to a predetermined frequency, such as a fundamental frequency (first harmonic). Thus, the quasi-square wave voltage may be filtered by the SRT 136 to generate a square wave voltage with a current consisting primarily of the fundamental. The amplitude of the fundamental voltage of the quasi-square wave may be controlled by the controller 106 to be equal to or greater than the fundamental of the square wave induced upon the primary winding(s) of the transformer with the amplitude of the square wave just equal to or greater then the conduction voltage. In this way the SRT 136 may act as a constant current source for the transformer (T) 108, and as an intermediate filter between the first and second sets of switches 132 and 134 and the transformer (T) 108.

The resonant frequency (fr) of the example SRT 136 illustrated in FIG. 1 may be expressed as:

$$f_r = \frac{1}{2 \cdot \pi \cdot \sqrt{L \cdot (C_1 + C_2)}} \quad \text{EQUATION 2}$$

The inductance expressed as L in Equation 2 may include the leakage inductance of the transformer as seen from the primary with any single secondary shorted. The power converter 100 may be operated at a frequency above that of the resonant tank or below, thus achieving various states of soft switching for each of the first and second sets of switches 132 and 134. In the example power converter 100, the resonant frequency may be chosen to be below that of the switching frequency. Throughout most of the operating range, the power converter 100 may achieve zero voltage switching at turn on for the leading leg, such as the first set of switches 132. Similarly, the lagging leg, such as the second set of switches 134 may achieve zero current switching at turn off throughout a great deal of the operating range.

Figure 5:
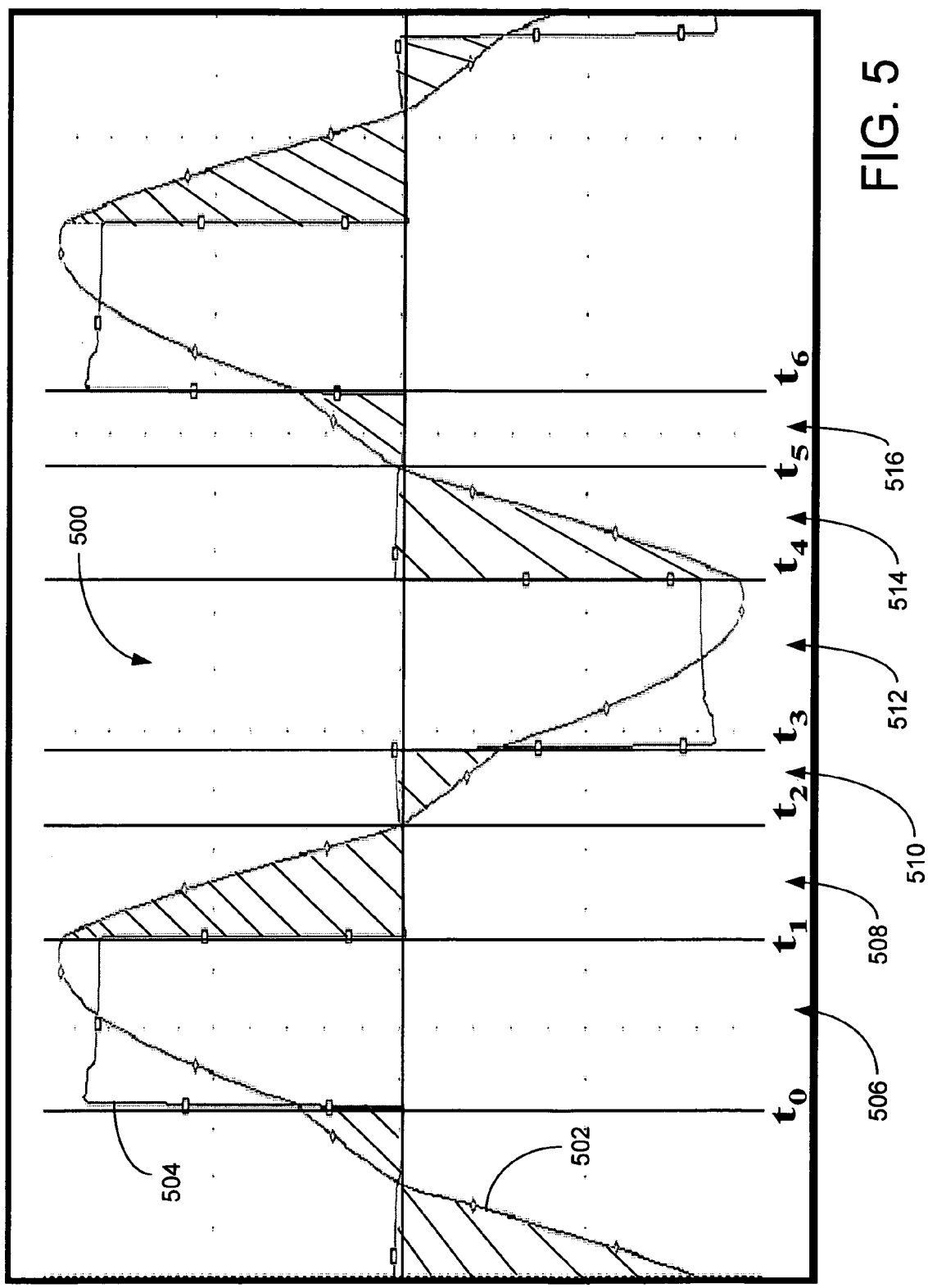
FIG. 5 is a graph of an example voltage and current switching waveform for the power converter of FIG. 1.

FIG. 5 depicts an example switching cycle 500 of a power converter 100 operating with AC power supplied from the power supply line 118. The example switching cycle occurs at the frequency of the switching frequency provided by the controller 106, such as 40 kHz. A resonant current waveform ($I_r$) 502, and the differential voltage 406, are shown along with a plurality of time steps ($t_0$-$t_6$) indicating where switching transitions take place. The differential voltage 406 is the quasi-square wave and is represented with a resonant voltage waveform ($V_r$). The resonant current waveform ($I_r$) 502 is provided to the primary of the transformer 108, and is proportional to the difference in the fundamental components of the voltage between the differential voltage 406 and the primary voltage supplied to the primary winding of the transformer 108.

In FIG. 5, the time steps include a first time period 506 that is identified to be from time $t_0$ to time $t_1$, a second time period 508 is identified to be from time $t_1$ to time $t_2$, a third time period 510 is identified to be from time $t_2$ to time $t_3$, a fourth time period 512 is identified to be from time $t_3$ to time $t_4$, a fifth time period 514 is identified to be from time $t_4$ to time $t_5$, and a sixth time period 516 is identified to be from time $t_5$ to time $t_6$.

Figure 6:
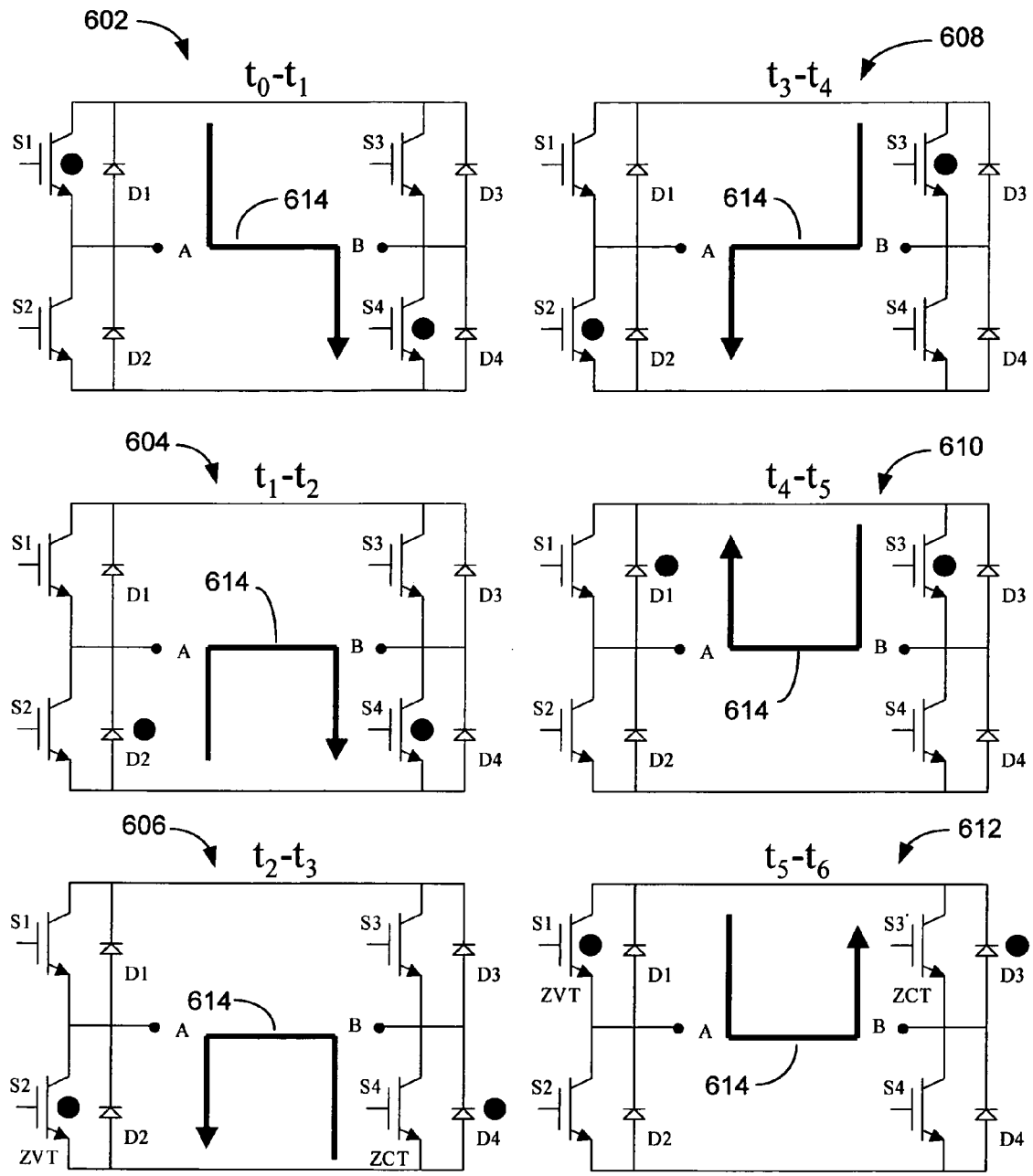
FIG. 6 is an example flow of current throughout a switching cycle of the power converter of FIG. 1.

FIG. 6 depicts a plurality of example switch position scenarios 602, 604, 606, 608, 610, and 612 within the switching stage 104 (FIG. 1) and a corresponding current path 614. The example switch position scenarios 602, 604, 606, 608, 610 and 612 correspond to the time periods 506, 508, 510, 512, 514 and 516 of FIG. 5. In each of the switch position scenarios, the switches 138 and/or diodes 140 that are conducting are denoted with a black dot.

During operation, in the first switch position scenario 602 and the first time period 506, the switches 138 identified as $S_1$ and $S_4$ are conducting. When the second time period 508 is entered, the switch 138 identified as $S_1$ has turned off, and the current path 614 transitions to the diode 140 identified as D2, while the switch 138 identified as $S_4$ continues conducting. When the third time period 510 commences, there is a current direction reversal as illustrated by the current path 614 when the diode 140 identified as D4 begins conducting, and the switch 138 identified as $S_2$ begins conducting. During the fourth time period 512, the switch 138 identified as $S_3$ begins conducting, and the switch 138 identified as $S_2$ continues conducting. In the fifth time period 514, the switch 138 identified as $S_2$ turns off, and the current path transitions to flow through the diode 140 identified as D1 and the switch 138 identified as $S_3$. When the sixth time period 516 is entered, another current reversal occurs, and the diode 140 identified as D3, and the switch 138 identified as $S_1$ provide the current path 614.

In FIGS. 5 and 6, during the first time period 506 from $t_0$-$t_1$, as depicted in the first switch position scenario 602, the switch 138 identified as $S_1$ in the first set of switches 132 and the switch 138 identified as $S_4$ the second set of switches 134 are conducting. Accordingly, a line current may flow from the power supply line 118 through the switch 138 identified as $S_1$ in the first set of switches 132 and the switch 138 identified as $S_4$ in the second set of switches 134. The resulting resonant current waveform ($I_r$) 502 coincides with a current flow from the AC line during the time period from $t_0$-$t_1$. During the time period $t_0$-$t_1$, the relative phase of the first and second voltage outputs 402 and 404 is also greater than zero resulting in the differential voltage 406 being greater than zero. (FIG. 4) The peak of the quasi-square wave of the differential voltage 406 may be about equal to the instantaneous supply line voltage provide from the power supply line 118 (FIG. 1). In addition, during the time period $t_0$-$t_1$, the line current may also flow from the power supply line 118 to charge the charge storage (Cp) 130 (FIG. 1).

The fourth time period 512 from $t_3$-$t_4$ and the fourth switch position scenario 608 of FIGS. 5 and 6 illustrate a second period of conduction of line current from the source 116. As illustrated by the corresponding current path 614 in the fourth switch position scenario 608 of FIG. 6, the line current 614 is again flowing from the power supply line 118 during time $t_3$-$t_4$ through the switches 138 identified as $S_3$ and $S_2$ and may also flow to charge the charge storage (Cp) 130 (FIG. 1). In addition, the relative phase of the first and second voltage outputs 402 and 404 may be greater than zero resulting in a differential voltage 406.

The remainder of the time periods 508, 510, 514 and 516, namely $t_1$-$t_2$, $t_2$-$t_3$, $t_4$-$t_5$ and $t_5$-$t_6$, and respective switch position scenarios 604, 606, 610 and 612 are representative of time periods where the current is circulating without conduction from the source 116 through the switches 138. During the time periods where the current is circulating, charge storage (Cp) 130 (FIG. 1) may still receive line current from the power supply line 118. In FIG. 5, the time when no line current is flowing to the sets of switches 132 and 134 is identified as the cross-hatched areas inside of the resonate current waveform 502 when the differential voltage 406 is substantially zero. During the time when no line current is flowing to the first and second sets of switches 132 and 134, circulating current is flowing out of one set of switches 132 or 134 to the other set of switches 132 or 134 and then through the SRT 136 and the transformer 108. The charge storage (Cp) 130 also may be discharging to provide circulating current during the when no line current is flowing to the first and second sets of switches 132 and 134.

Another function of the series resonant tank (SRT) 136 can be to provide a mechanism to determine the current flowing through the switching stage 104. By integrating the voltage ($V_L$) across a known inductance (L), the current through the inductor ($i_L$), and hence the resonant tank current ($i_L$) can be calculated as follows:

$$i_L = \frac{1}{L} \cdot \int v_L dt \qquad \text{EQUATION 3}$$

The SRT 136 may have a voltage gain that operates over the full range of possible loads. As the current in the SRT 136 increases, with frequency being fixed or variable, the effective impedance can become significant. At voltages near the line current conduction point, the effective duty cycle of the differential voltage 406 can approach 50% in order to conduct the demanded line current to the load side of the transformer (T) 108. The SRT 136 may be designed such that the voltage gain, defined from the input of the inductor (L) 142 to the output of the capacitor 144, deviates as little as possible from unity. The more the gain of the SRT 136 drops, the greater can be the impact on the effective power factor due to reduced effective conduction angle or line voltage duty cycle.

Power Converter Control

Figure 7:
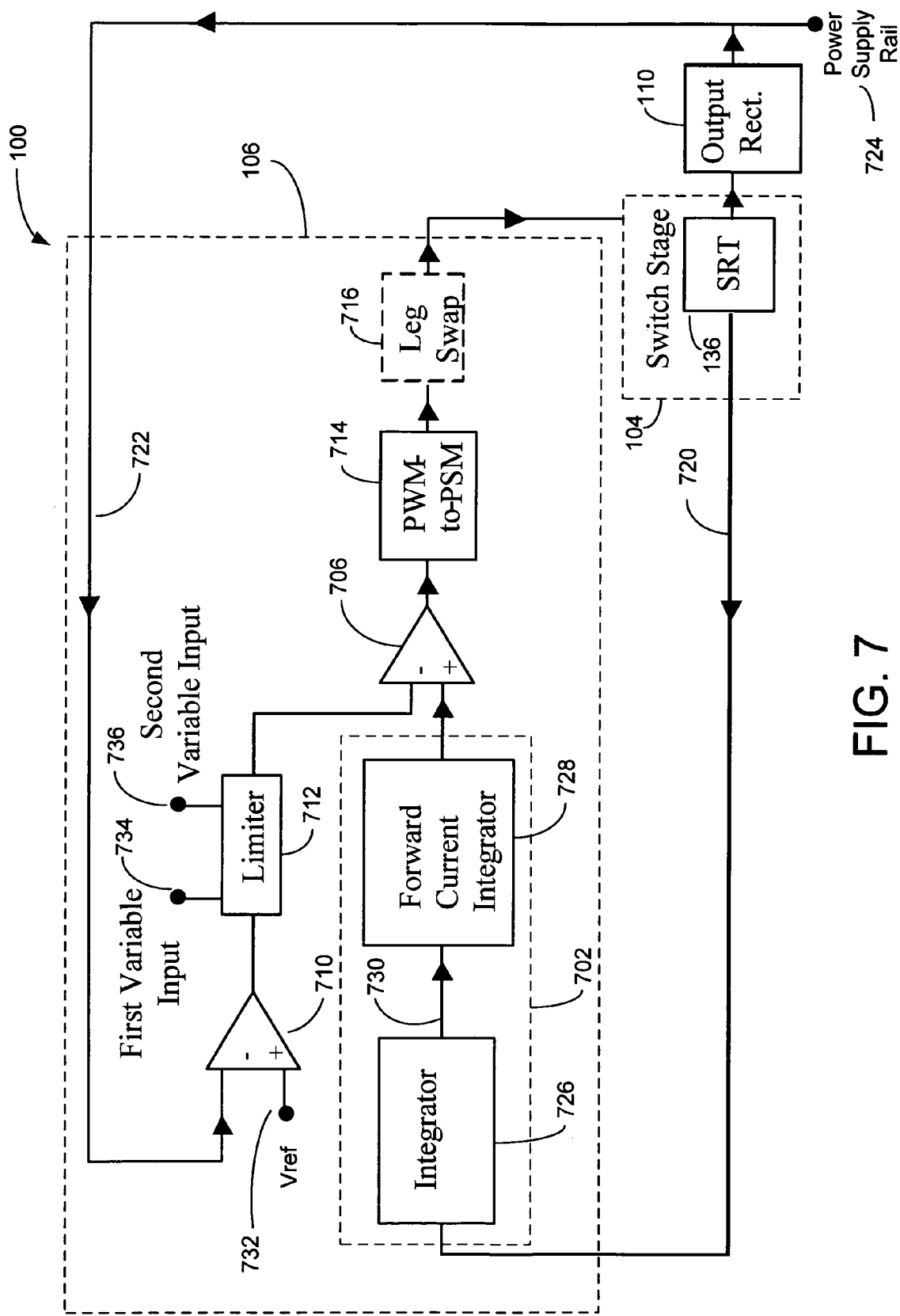
FIG. 7 is a block diagram of an example control system for the power converter of FIG. 1.

FIG. 7 is a block diagram of a portion of the power converter 100 illustrated in FIG. 1 that includes the controller 106, the switching stage 104, and the output rectifier 110. In the example controller 106 depicted in FIG. 7, the controller 106 includes a current sensor circuit 702 that is coupled to a first input of a comparator 706. The controller 106 also includes a feedback controller circuit 710 coupled with a limiter circuit 712. The limiter circuit 712 is coupled with a second input of the comparator 706. The output of the comparator 706 is coupled with a pulse width modulation-to-phase shift modulation (PWM-to-PSM) converter 714, which may be coupled to a leg swapping circuit 716.

The leg swapping circuit 716 is an optional control feature that may or may not be included. Hence, the leg swapping circuit 716 is depicted with dotted lines in FIG. 7. The leg swapping circuit 716 may be coupled with switching stage 104. Alternatively, where the leg swapping circuit 716 is not included, the PWM-to-PSM converter 714 may be coupled with the switching stage 104. The PWM-to-PSM converter 714 may generate the switching signals used to drive the first and second sets of switches 132 and 134 (FIG. 1) included in the switching stage 104. The switching stage 104 also includes the SRT 136, and may be coupled with the output rectifier 110.

A first feedback line 720 may provide a first feedback signal indicative of the line current provided from the power supply line 118. In one example, the first feedback signal may be representative of an inductor voltage of the inductor (L) 142 that is used to determine the line current. The inductor voltage of the inductor (L) 142 may be measured across a separate winding within the inductor (L) 142, across an entire winding representative of inductor (L) 142, measure with a tap formed across a portion of one or more windings forming inductor (L) 142, or with any other technique to obtain a voltage representative of a voltage drop across at least a portion of the inductor (L) 142. In another example, the first feedback signal may be provided from a current sensor monitoring the current through the SRT 136, the output rectifier 110, or any other device.

A second feedback signal is provided on a second feedback line 722 to the feedback controller circuit 710. The second feedback signal may be representative of an output voltage, such as the scaled supply rail voltage feeding the load from a power supply rail 724. Alternatively, where there are multiple power supply rails, the second feedback signal may be an indication of a scaled differential voltage of the power supply rail voltages feeding the load.

The current sensor circuit 702 includes an integrator 726 and a forward current integrator 728. The integrator 726 may be any circuit or device capable of providing integration of an input signal over a time(t). In FIG. 7, the integrator 726 may receive the first feedback signal from the first feedback line 720. The integrator 726 may use the first feedback signal to determine the current flowing through the inductor (L) 142 based on the voltage across the inductor (L) 142. An output of the integrator 726 may be representative of an inductor current that is provided on an inductor current line 730. More specifically, the inductor current may be a scaled current through the resonant inductor (L) 142 determined by mathematical integration of the inductor voltage of the inductor (L) 142.

The forward current integrator 728 may be any circuit or device capable of integration. In one example, the forward current integrator 728 may integrate the inductor current when the power converter 100 is conducting in a forward direction. The inductor current may be integrated during the time when the power converter 100 is conducting in a forward direction to determine the line current, such as an average AC line current.

Figure 8:
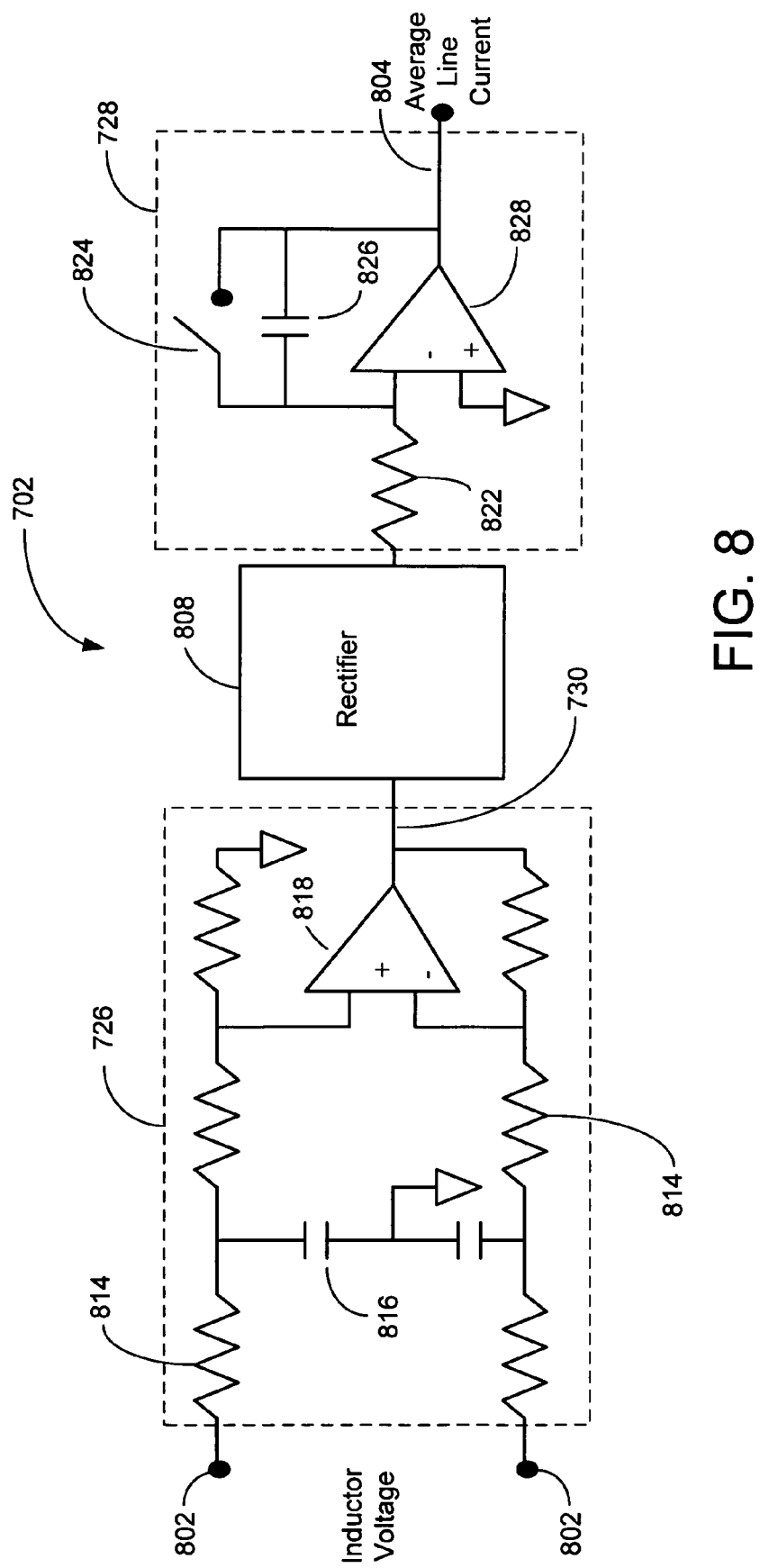
FIG. 8 is a circuit diagram of an example average line current circuit included in the control system of FIG. 7.

FIG. 8 is a more detailed circuit diagram of one example of the average line current circuit 702. The current sensor circuit 702 can be connected with the inductor (L) 142 at an inductor voltage input 802 that receives the inductor voltage. The average line circuit 702 may provide an average line current to the comparator 706 (FIG. 7) at an average line current output 804. The integrator 726 may be a passive integrator and differential receiver that includes a plurality of resistors 814, a plurality of capacitors 816, and an amplifier 818. The output of the amplifier 818 is provided on the inductor current line 730. The forward current integrator 728 may be an active integrator. The forward current integrator 728 includes a resistor 822, a switch 824, a capacitor 826, and an amplifier 828. The current sensor circuit 702 also includes a rectifier 808 coupled between the integrator 726 and the forward current integrator 728. The rectifier 808 may be a precision full-bridge rectifier.

During operation, an inductor voltage signal may be provided to the inductor voltage input 802, passively integrated and scaled by the resistors 814 and the capacitors 816, and provided to the amplifier 818. The amplifier 818 may act as a differential receiver to mathematically integrate the inductor voltage signal as previously discussed with reference to EQUATION 3. The output signal of the amplifier 818 is representative of an inductor current and is provided on the inductor current line 730. The output representative of the inductor current may be rectified by the rectifier 808 and provided to the forward current integrator 728. The rectified output representative of the inductor current may be received and integrated by the amplifier 828 when the switch 824 is closed. The switch 824 may be closed whenever the power converter 100 is conducting in a forward direction.

The power converter 100 conducts in a forward direction when the relative phase of the first and second voltage outputs is different. When the relative phase of the first and second voltage outputs is different, the first and second voltage outputs do not completely overlap, and the differential voltage 406 (FIG. 4) is greater than zero. In other words, as discussed with reference to FIGS. 5 and 6, during the first time period 506 and the fourth time period 512 when line current is being supplied from the power supply line 118 while the resonant voltage ($V_r$) (differential voltage 406) is greater than zero. Control of the switch 824 may be with a processor, a sensor, or any other device capable of determining when the power converter 100 is conducting in a forward direction. The output of the amplifier 828 is representative of the average line current drawn from the power supply line 118. The output of the forward current integrator 728 can be time averaged in order to create a representation of the line current, and is used to determine the overlap or relative phase of the first and second voltage outputs from the first and second sets of switches 132 and 134.

In FIG. 7, the feedback controller circuit 710 can be any form of proportional and/or integral control device. Alternatively, the feedback controller circuit 710 may also include a derivative term to speed up the response of the controller 710, at the possible expense of optimizing the power factor. The feedback controller circuit 710 may be used in the main voltage feedback control loop to provide constant current control as previously discussed. Inputs to the feedback controller circuit 710 may include the second feedback signal that is the scaled supply rail voltage feeding the load and a reference voltage ($V_{REF}$) supplied on a reference voltage line 732. The reference voltage may be a constant, predetermined voltage, or a variable voltage that is variable in a predetermined range.

Figure 9:
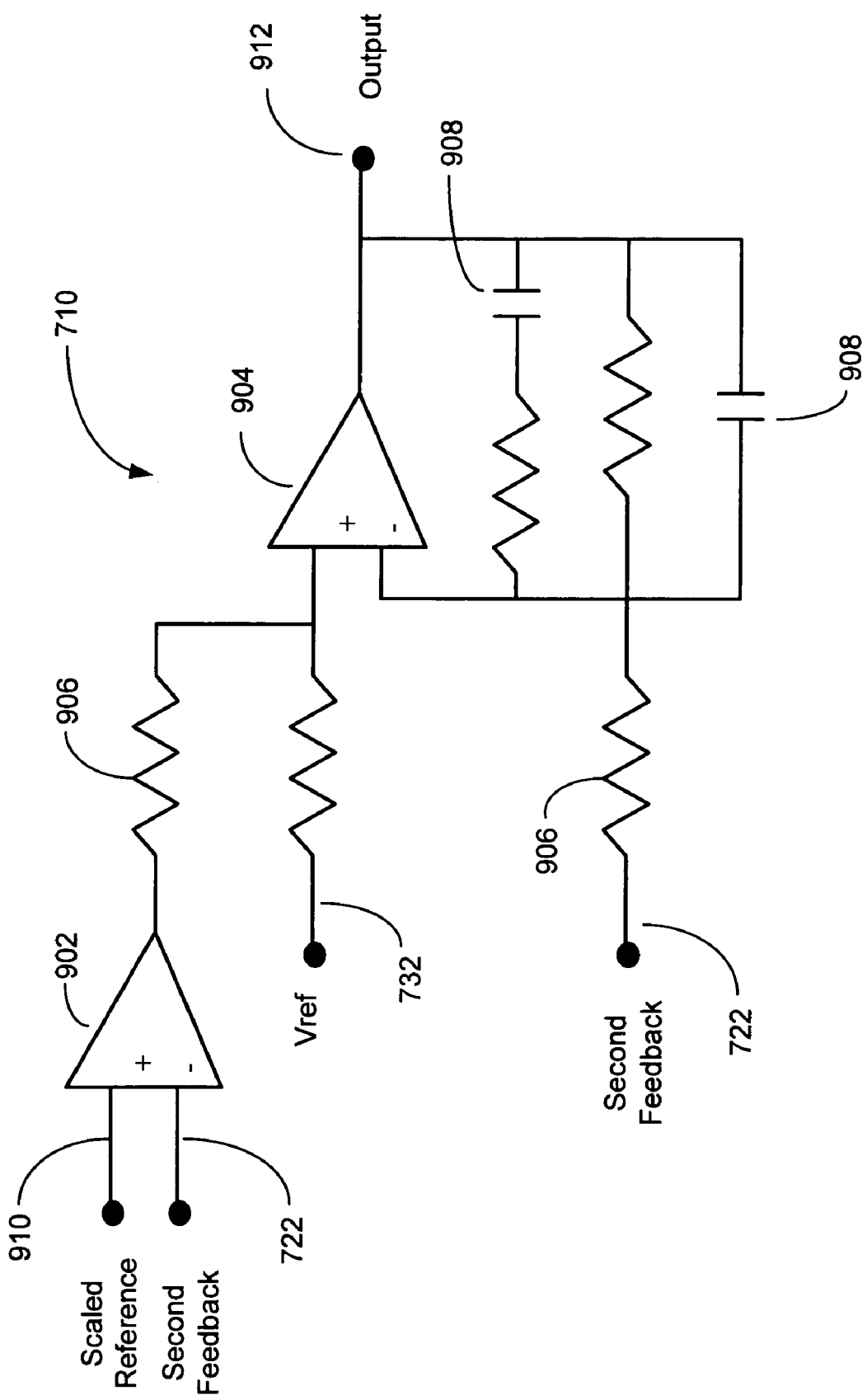
FIG. 9 is a circuit diagram of an example feedback controller circuit included in the control system of FIG. 7.

FIG. 9 is a more detailed circuit diagram of one example of the feedback controller circuit 710 depicted in FIG. 7. The feedback controller circuit 710 includes an open collector comparator 902, a main feedback controller 904, a plurality of resistors 906 and a plurality of capacitors 908 coupled as illustrated. The open collector comparator 902 may receive the second feedback signal on the second feedback line 722. In addition, the open collector comparator 902 may receive a scaled reference signal on a reference signal line 910. In one example, the scaled reference signal may be the reference voltage ($V_{REF}$) provided on the reference voltage line 732 that has been increased by a constant M.

During operation, the second feedback signal on the second feedback line 722 may have a value at or very near the reference voltage ($V_{REF}$). In order to clamp an overshoot of the output voltage provided on the power supply rail 724, the scaled reference signal provided on the reference signal line 910 may be made larger then the reference voltage ($V_{REF}$) by a determined percentage. Accordingly, the reference voltage ($V_{REF}$) may be multiplied by a constant M, where M is equal to the sum of unity and the predetermined percentage, to form the scaled reference signal on the reference signal line 910.

The output of the open collector comparator 902 may be provided as a feed forward signal to adjust the reference voltage ($V_{REF}$) provided to the main feedback controller 904 on the reference voltage line 732. The main feedback controller 904 may include one or more non-linear loop(s) formed with, for example, the open collector comparator 902 in order to intercept the reference voltage ($V_{REF}$). The main feedback controller 904 also may receive the previously described second feedback signal from the second feedback signal line 722. The main feedback controller 904 may be any form of proportional, integral and/or derivative controller.

During operation, as the scaled power supply rail voltage (second feedback signal) begins to overshoot the scaled reference signal, the reference voltage ($V_{REF}$) that is an input to the main feedback controller 904 may be immediately reduced, thus forcing an output error signal on an output line 912 of the main feedback controller 904 to a low or non-conducting state. This in turn may clamp the voltage on the main output of the power converter 100 (the power supply rail 724) from further increasing. Such control techniques may be deployed to optimize the power factor when the tolerance for overshoot in the power converter 100 is low. This technique may allow for a relatively slow main feedback loop around the main controller 904 and relatively fast acting overshoot protection formed by the components around the open collector comparator 902.

In FIG. 7, the limiter circuit 712 may be any circuit or device capable of preventing an input signal from exceeding a determined maximum threshold value. The limiter circuit 712 may have one or more inputs, such as a first variable input on a first variable input line 734 and a second variable input on a second variable input line 736 that may be used in the calculation of an absolute limit. The first variable input may be a load related variable input and the second variable input may be a line related variable input. For example, the first variable input may be predetermined value, or derived from a measured voltage such as from the scaled differential rail voltage of the power supply rails 150 and/or 152.

The second variable input may be a predetermined value, or may be derived from a measured voltage, such as a line voltage supplied from the power supply line 118. During operation, the limiter circuit 712 may vary the absolute limit applied to the output error signal received from the feedback controller circuit 710 to keep the output error signal generated by the feedback controller circuit 710 within set limits. An output of the limiter circuit 712 may be the output error signal provided by the feedback controller circuit 710 that has been limited to a range controlled by the limiter circuit 712. In other words, the limiter circuit 712 may limit the output error signal when the output error signal exceeds a determined threshold, and may otherwise pass the output error signal unchanged to the comparator 706. The limited, or not limited, output error signal may be a reference supply line current that is provided to the comparator 706.

Figure 10:
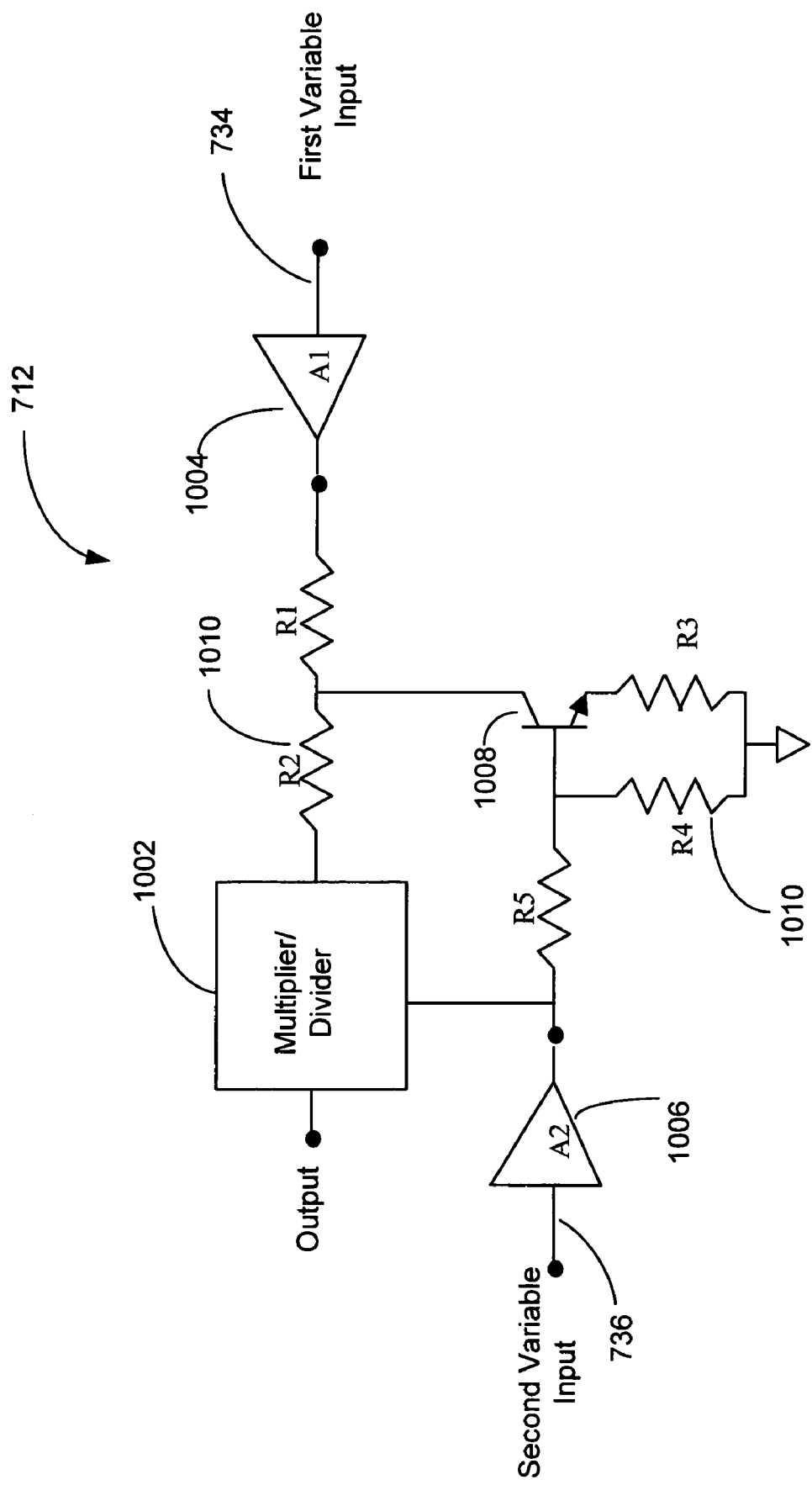
FIG. 10 is a circuit diagram of an example limiter circuit included in the system of FIG. 7.

FIG. 10 is a more detailed circuit schematic of one example of the limiter circuit 712 depicted in FIG. 7. The limiter circuit 712 may include a multiplier/divider 1002, a first amplifier 1004, a second amplifier 1006, a transistor 1008, and a plurality of resistors 1010. The limiter circuit 712 may determine an upper current limit for the line current to protect the power converter 100 from overload In addition, the limiter circuit 712 may compensate for the increased conduction angle on the power supply line 118 at higher input voltages. Further, the limiter circuit 712 may compensate for current related losses in the power converter 100 in determining the upper current limit for the line current. The first and second amplifiers 1004 and 1006, the transistor 1008 and the resistors 1010 can avoid an excessive calculated upper current limit as line voltage is increased.

There may be multiple operating control modes for the power converter 100. In one example, there are two control modes. Mode 1 may be used when power is initially applied to the power converter 100. In addition, mode 1 may be used for various other conditions, such as when the line voltage drops below a determined threshold, a front panel switch of the power converter 100 is cycled, a breaker feeding the power supply line 118 is cycled, or if for some reason the power supply output rail(s) voltage drops below a preset minimum indicating either a short circuit or an amplifier problem. Mode 1 may be considered as a soft start operational mode used to reduce stress on the power supply line 118 when charging up the secondary side capacitors 158. In mode 1, the current limit may be fixed at a suitably low level, and the control loops of the power converter control and the limiter circuit 712 may be disabled. With the current limit set low, the bulk of the capacitance can be charged at a desirably low line current flow rate such that any surges on the power supply line 118 may be minimized. Mode 1 may be disabled once the power supply output rail(s) reach a predetermined threshold, such as a respective nominal voltage value.

Mode 2 may be a second operational mode of the power converter 100. During mode 2, calculations may be constantly being made by the limiter circuit 712 to set the upper limit for the line current in order to obtain the same maximum power output regardless of the line voltage from the power supply line 118. As previously discussed, the power converter may have a "universal input" so that the line voltage may be anywhere in a predetermined range such as between about 85 Vac and 277 Vac or between about 120 Vac and 240 Vac. In other examples, additional modes may also be included in the power converter 100, such as a thermally limited power mode. In a thermal limit mode, for example, the power converter 100 may sense temperatures of one or more circuit elements. The upper current limit may be reduced by the limiter circuit 712 accordingly when the sensed temperature(s) is at or above a determined temperature, thereby reducing dissipation.

Because the turns ratio of the step-up transformer (T) 108 may be fixed, and the output voltage of the power converter 100 can be regulated, the voltage needed on the primary of the transformer (T) 108 can be achieved earlier in a duty cycle of the power supply line 118, such as an AC half-cycle. In addition, the throughput conduction percentage of the line cycle time period can be increased as the voltage on the power supply line 118 is increased. Accordingly when the line voltage is decreased the throughput conduction percentage of the line cycle time period can be reduced. Conduction losses may also increase with lower line voltages, due to the high currents necessary to achieve a regulated supply with a fixed output voltage.

Referring to FIGS. 7, 8, 9, and 10, during operation in one example, the limiter circuit 712 may receive with the second amplifier 1006 the line voltage, such as an average AC line voltage, as the second variable input signal on the second variable input line 736. The line voltage may be scaled by the second amplifier 1006 and provided to the multiplier/divider 1002. In addition, the first amplifier 804 may receive a power supply rail voltage, such as the differential rail voltage of the power supply rails 150 and/or 152, as the first variable input signal on the first variable input line 734. The multiplier/divider 1002 may calculate an upper current limit ($I_{upper}$) for the power converter 100 to achieve maximum power output based on the line voltage ($V_{in}$), the power supply rail voltage ($V_{rail}$), and a constant K as:

$$I_{upper} = V_{rail} * (K/V_{in}) \qquad \text{EQUATION 4}$$

The value K may be used to bring the output of the multiplier/divider 1002 in to the operational range of the comparator 706. K may also exhibit a nonlinear quality in order to compensate for an increasing line conduction angle as the line voltage is increased.

By comparing the power supply rail voltage, such as a scaled differential rail voltage, to a known reference voltage, a current limit may be derived, such as from the feedback controller circuit 710. As demand on the power converter 100 increases, the power supply rail voltage may decrease. The difference between the reference voltage and the scaled power supply rail voltage may be referred to as an error. The error may be used to determine an average that may be used as the upper current limit. The upper current limit may be determined by the limiter circuit 712 when the power converter 100 is powered up, and may be maintained until the power converter 100 is powered down. Alternatively, a predetermined magnitude of variation in the line voltage on the power supply line 118 may trigger re-calculation of the upper current limit.

In FIG. 7, during operation, the comparator 706 can generate a varying drive signal that is provided to the PWM-to-PSM converter 714. The drive signal may be generated based on comparison of the output representative of the average line current from the current sensor circuit 702 and the range limited, or not range limited, output error signal provided by the limiter circuit 712. The comparator 706 may be fast enough to generate the drive signal multiple times within a cycle of the first and second voltage outputs generated by the respective first and second sets of switches 132 and 134. Thus, for example, at the time during the cycle when the output representative of the average line current exceeds the output error signal, the comparator 706 may generate a drive signal.

In one example, the drive signal may be a digital signal that is at a logic zero to enable phase shifting of the relative phase of the first and second voltage outputs generated by the respective first and second set of switches 132 and 134. Conversely, when the drive signal is at a logic one, phase shifting of the first and second voltage outputs may be disabled. In other examples, the logic states may be reversed. The relative phase shifting switching signals may be generated by the PWM-to-PSM converter 714.

In this example, when a cycle commences, the drive signal may be at a logic zero, and shifting of the relative phase is enabled. As the cycle proceeds, while the relative phase continues to shift towards the maximum relative phase shift of 50% (FIG. 4), the output representative of the average line current may exceed the output error signal. At this time in the cycle, the comparator 706 may generate a logic one drive signal, thus terminating further relative phase shifting during that cycle and resulting in some percentage of relative phase shift, such as 16.7% or 37% of a relative phase shift (see FIG. 4). In one example, the change in logic state of the drive signal may occur twice per cycle, once during the positive portion of the cycle and once during the negative portion of the cycle. Accordingly, the relative phase shift may commence at the beginning of each half cycle and may terminate sometime during the half cycle when the output representative of the average line current exceeds the output error signal. It follows that when the output representative of the average line current does not exceed the output error signal, the drive signal will enable the relative phase to be shifted by 50%. In other examples, the change in logic state of the drive signal may occur any number of times during a cycle.

The PWM-to-PSM converter 714 may not only create a pulse width modulated signal based on the switching control signals, but also convert a pulse width modulated signal to a phase shift modulated signal based on the drive signal input and the switching control signals. The phase shift modulated signal may be provided to the switching stage 104 to control the switching of the first and second sets of switches 132 and 134. The respective first and second voltage outputs may be provided to the SRT 136 for filtering or averaging and then be provided to the transformer (T) 108 and output rectifier 110.

Average Line Current

The average line current, such as an AC line current, may be determined by integrating the voltage across a single turn of wire on the resonant inductor (L) 142, as previously discussed. The integrated voltage may yield a scaled waveform that has the shape of the current through the series resonant tank (SRT) 136 and a known scaled magnitude. The scaled waveform may then be integrated over only the portion of time that the phase shifted voltage outputs of the first and second sets of switches 132 and 134 overlap. The result of the integration may be an average input line current. In FIGS. 5 and 6, as previously discussed, the line current is conducting, or forwarded, during the time durations $t_0$-$t_1$ and $t_3$-$t_4$ and thus the first and second voltages of the respective first and second switches are overlapped during these time durations. By utilizing an integrator during these time durations that is reset when not in use, the average line current can be calculated twice per switching period.

Once the integrated line current reaches a determined threshold, such as a "forward current reference" that is the input current limit, the switching cycle of the first and second switches 132 and 134 may be terminated. The operation of the current sensor circuit 702 may lead to generation of a pulse width modulated control signal within the PWM-to-PSM converter 714, which may be converted to phase shift modulation by the PWM-to-PSM converter 714 (FIG. 7). The control signal may be used to control each of the first and second set of switches 132 and 134 in the switching stage 104. The control signal may change substantially continuously throughout each cycle of the power supply line 118, such as being refreshed numerous times throughout each AC half-cycle in order to maintain a relative constant current draw from the power supply line 118. In addition, the duty cycle envelope of the control signal may be continued over successive power supply line 118 cycles or for a predetermined period of time since it is a function of the input voltage, the output voltage, and the load seen by the power converter 100.

In order to achieve desirable power factor, the response of the controller 106 may be made slow enough so that transient load conditions on the power converter 100 are not transferred immediately to the power supply line 118. However, slower control may create a condition, under highly dynamic conditions, where overshoot can occur at the output of the power converter 100. In order to alleviate the possibility of this condition, a non-linear element may be added to the control loop. For example, a non-linear element may be added to the circuit that includes the comparator 902 in FIG. 9. The non-linear element may have greater speed then the main control loop as previously discussed to avoid overshoot of the power supply output.

In FIG. 7, another feature that may be implemented in the power converter 100 is the leg-swapping circuit 716. As previously discussed, the power converter 100 may include a leading leg and a lagging leg. Each of the leading and lagging legs may include one or more sets of switches. In FIG. 7, each of the leading and lagging legs include one set of switches 132 and 134 having two switches 138. In other examples, additional or fewer sets of switches, and switches within each set may be present. For purposes of explanation only, the example of FIG. 7 will be further described, but should not be construed as limiting the configuration or operational functionality of the leg-swapping circuit 716 to any particular switching stage configuration.

In FIG. 7, due to the different switching conditions that each of the first and second set of switches 132 and 134 may be subjected to, losses may tend to be greater in one leg then the other. During the time when the power converter 100 is not conducting current to the secondary or output side of the power converter 100 (at zero crossing of the sine wave), the leading and lagging legs can be swapped or exchanged in response to a predetermined event or condition. Swapping of the leading and lagging legs may be accomplished by intercepting switching control signals (or switching signals) provided by the controller 106 and exchanging their destinations. Effectively, in the example of FIG. 7, the control signals controlling the switching of the first and second sets of switches 132 and 134 may be exchanged.

In one example, a temperature driven leg-swapping function may be implemented. During operation, switching of the switches 138 may generate heat. Conduction cooling such as with a heatsink may be used to minimize this heating. When the switches 138 are heated unevenly, that is, one or more switches 138 are hotter than the remaining switches 138, the hotter switch(s) 138 may experience additional stress, decreased efficiency, etc.

In one example, each of the sets of switches 132 and 134 may have a heatsink. The temperature of heatsinks associated with each of the sets of switches 132 and 134 may be monitored with a temperature sensor, such as a thermocouple. The temperature sensor may provide a signal indicative of temperature to the controller 106, or some other device capable of exchanging the switching control signals.

The hotter of the two heat sinks may trigger a swap in the control signals allowing the hotter heat sink to cool. In other examples, the temperature of each of the switches 138, groups of switches, or any other associated hardware may be monitored with a temperature sensor. Such a leg swapping technique may extend the range of power the power converter 100 is capable of providing and/or allow the power converter 100 to run longer at a given power level.

In another example, an automatic leg swapping circuit may be implemented. In this example, the legs may be swapped every AC half-cycle to make the average heat dissipation of the first and second sets of switches 132 and 134 substantially equal. A voltage detector may be used to determine when the AC voltage is below a predetermined threshold so that current draw from the line is substantially absent. For example, the voltage detector may detect the time during each duty cycle when the line current is not conducting.

Figure 11:
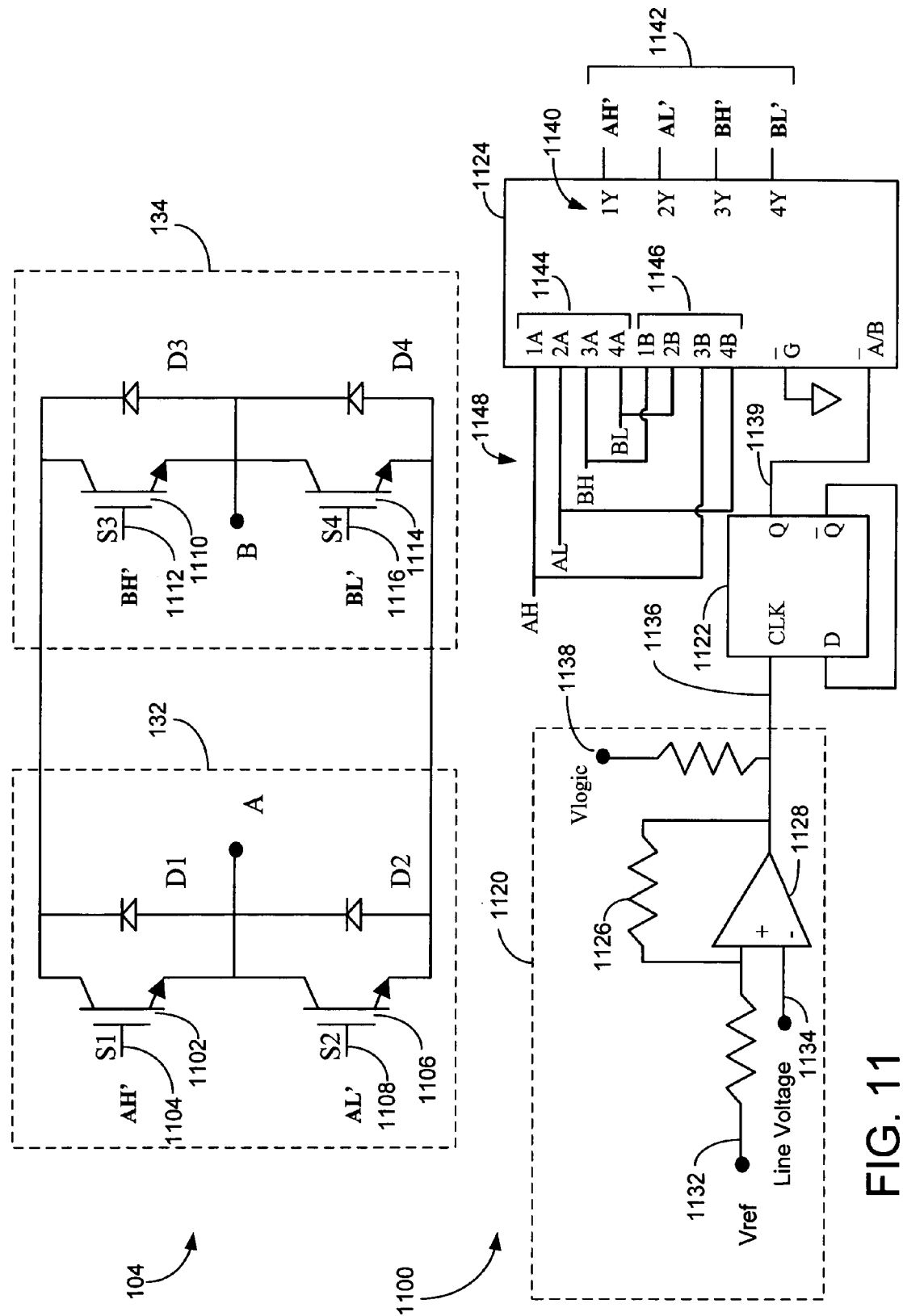
FIG. 11 is a circuit diagram of an example leading/lagging leg swapper circuit.

FIG. 11 is circuit schematic that depicts an example automatic leg swapping circuit 1100 and a portion of the switching stage 104. The illustrated portion of the switching stage 104 includes the first set of switches 132 and the second set of switches 134. In the first set of switches 132, a first switch ($S_1$) 1102 includes a first control line (AH') 1104 for receiving switching control signals, and a second switch ($S_2$) 1106 includes a second control line (AL') 1108 for receiving switching control signals. In the second set of switches 134, a third switch ($S_3$) 1110 includes a third control line (BH') 1112 for receiving switching control signals, and a fourth switch ($S_4$) 1114 includes a fourth control line (BL') 1116 for receiving switching control signals.

The leg swapping circuit 1100 of this example includes a detector circuit 1120, a register 1122, and an exchange circuit 1124. The detector circuit 1120 may be any device or circuit capable of detecting a variable associated with the operation of the power converter 100. In FIG. 11, the detector circuit 1120 is a voltage detector. In one example, when the power supply line is an AC power supply line, the detector circuit 1120 may be a hysteretic AC voltage detector. In other examples the detector circuit may detect any other predetermined condition or event, such as an event or condition related to temperature, power, current, switching frequency and/or any other variable parameter. The example detector circuit 1120 includes a plurality of resistors 1126, and a comparator 1128. The register 1122 may be any form of settable register. In FIG. 11, the register 1122 is an edge triggered D flip-flop. The exchange circuit 1124 may be any form of circuit or device capable of exchanging the control signals provided to the first and second sets of switches 132 and 134. In the example of FIG. 11, a 2-line to 1-line multiplexer may be used to swap the switching control signals provided to the leading leg and the lagging leg.

The automatic exchange of the switching control signals may be synchronized to a predetermined time, such as once per half-cycle. In addition or alternatively, the automatic exchange of the switching control signals may be confined to an exchange opportunity window. The exchange opportunity window may define ranges of line current flow and/or line voltage magnitude with regard to the first and second switches where swapping control signals is enabled. Alternatively, or in addition, the exchange opportunity window may define a load range where swapping is enabled. For example, in an audio amplifier application, the exchange opportunity window may enable exchange of the control signals only during times when an input audio signal falls below a determined threshold. In other examples, other techniques may be employed to achieve automatic leg swapping or leg swapping based on operational conditions.

In FIG. 11 during operation, a reference voltage ($V_{REF}$), such as a predetermined fixed voltage, may be received by the comparator 1128 on a reference line 1132. The comparator 1128 may also receive on a line voltage line 1134 a line related signal that is representative of the line voltage on the power supply line 118. In one example, when the line voltage is an AC line voltage, the line related signal representative of the line voltage supplied on the line voltage line 1134 may be a rectified and scaled AC line voltage. In addition, the reference voltage ($V_{REF}$) may be about zero volts. Thus, the comparator 1128 may change state when the line voltage is about zero volts, or when the sinusoidal waveform is crossing zero. The output signal of the detector circuit 1120 may be provided as an exchange signal to update the register 1122 on an exchange enable line 1136. In FIG. 7, the exchange signal may be adjusted with a voltage logic signal (Vlogic) on a voltage logic line 1138 to interface the output of the comparator 1128 with the register 1122 when the register 1122 is operating at a different voltage then the comparator 1128. In examples where the voltages are compatible, the voltage logic signal (Vlogic) may be omitted.

As the output signal of the detector circuit 1120 changes state, the register 1122 may be enabled to toggle between states. In FIG. 11, the output signal of the detector circuit 1120 is provided as an input to the clock line of the register 1122 (D flip-flop). Accordingly, as the input to the clock line goes low, the output (Q) of the register 1122 takes on the then current state of the D input of the register 1122. Thus, the register 1122 may toggle between a logic zero and a logic one state with each falling edge of the output signal of the detector circuit 1120. The output of the register 1122 is an enable signal received by the exchange circuit 1124 on an enabling input 1139. In FIG. 11, the enable signal is a digital signal that enables operation of the exchange circuit 1124. In other examples, other logic configurations may be used that perform similar functionality. In addition, changes to the detector circuit, the register 1122 and the exchange circuit 1124 may be necessary when other example implementations of the leg swapping circuit 1100 are deployed.

In FIG. 11, the exchange circuit 1124 may include a plurality of control signal outputs 1140, identified as control signal outputs 1Y, 2Y, 3Y, and 4Y. The control signal outputs 1Y, 2Y, 3Y, and 4Y are configured to drive respective output switching control signals 1142 identified as AH', AL', BH' and BL' on the respective control lines 1104, 1108, 1112, and 1116. Accordingly, the control signal outputs identified respectively as 1Y, 2Y, 3Y, and 4Y drive respective first (S1), second (S2), third (S3) and fourth (S4) switches 1104, 1106, 1110 and 1114.

In addition, the exchange circuit 1124 may include a plurality of sets of control signal inputs. In FIG. 11 a first set of control signal inputs 1144 are designated as 1A, 2A, 3A, and 4A, and a second set of control signal inputs 1146 are designated as 1B, 2B, 3B, and 4B. A set of input switching control signals 1148 are provided on the sets of control signal inputs 1144 and 1146. The set of input switching control signals 1148 may be provided from the controller 106. In FIG. 11, the input switching control signal 1148 identified as AH is provided to the first control signal input 1144 identified as 1A, and to the second control signal input 1146 identified as 3B. Similarly, the input switching control signals 1148 identified as AL, BH and BL are provided to the respective first control signal inputs 1144 identified as 2A, 3A and 4A and to the respective second control signal inputs 1146 identified as 4B, 1B and 2B.

The exchange circuit 1124 may selectively direct the input switching control signals 1148 provided on either the first set of control signal inputs 1144 or on the second set of control signal inputs 1146 to the control signal outputs 1140. In the first set of control signal inputs 1144, each of the control signal inputs identified as 1A, 2A, 3A and 4A may be directed to the respective control signal outputs 1140 identified as 1Y, 2Y, 3Y and 4Y. Similarly, in the second set of control signal inputs 1146, each of the control signal inputs identified as 1B, 2B, 3B and 4B may be directed to the respective control signal outputs 1140 identified as 1Y, 2Y, 3Y and 4Y.

Thus, when enabled, the exchange circuit 1124 may redirect the signals being fed to the first set of switches 132 to the second set of switches 134, and redirect the signals being fed to the second set of switches 134 to the first set of switches 132. Since, in this example, the exchange circuit 1124 may be enabled during zero crossings of the line voltage, there is substantially no voltage present at the first and second sets of switches 132 and 134 during the exchange of control signals. The control signals may be redirected by the exchange circuit 1124 by directing the first set of control signal inputs 1144 to the control output signals 1140 instead of the second set of control signal inputs 1146, or vice-versa. In other words, the exchange circuit 1124 may direct either the first set of control inputs 1144 designated as 1A, 2A, 3A, and 4A or the second set of control signal inputs 1146 designated by 1B, 2B, 3B, and 4B to the control signal outputs 1140 designated respectively as 1Y, 2Y, 3Y, and 4Y.

Accordingly, in FIG. 11 there are two possible inputs (A or B) for each output (Y). Either the A input may be designated or the B input may be designated based on the exchange signal provided as an input to the register 1122 and thereafter provided as the enable signal on the enabling signal line 1139. In FIG. 11, during operation, when the enabling signal is a logic low input, the exchange circuit 1124 will provide the A outputs to Y. When the enable signal is a logic high input, the exchange circuit 1124 will provide the B inputs to Y. In other examples, more possible inputs are possible. In addition, in other examples, the operation of the exchange circuit may occur with a processor or other logic performing similar functionality.

The previously described power converter 100 is operable with a single stage switching stage 104 to provide substantially constant line current while optimizing power factor. The power converter may control the shape of the waveform of the line current with phase shift modulation through control of the voltage waveform at the primary of the transformer 108. The voltage present at the primary of the transformer 108 may be controlled based on a derived representation of the line current and a load on the power converter 100. The derived representation of the line current may be obtained by integration of a voltage present across the inductor (L) 142 in the SRT 136. The power converter 100 may also include leg swapping functionality to extend the operating range and/or capability of the power converter 100.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A power converter comprising:
   a single stage switching stage suppliable with a supply line current and a supply line voltage from a power source;
   a controller coupled with the single stage switching stage, where the controller is operable to control the switching frequency of the switching stage to generate a switch generated voltage; and
   a transformer having a primary winding and a secondary winding, where the transformer is wound to have a predetermined reflected voltage and is operable to receive the switch generated voltage at the primary winding; and
   where the controller is operable to direct the single stage switching stage to vary the switch generated voltage as a function of the predetermined reflected voltage, and to selectively conduct the line current to the primary winding to create a substantially constant line current flow.

2. The power converter of claim 1, where the controller comprises an average line current circuit that is operable to determine the supply line current suppliable to the single stage switching stage, and the controller is operable to control the single stage switching stage as a function of the determined supply line current.

3. The power converter of claim 2, further comprising an inductor included in the single stage switching stage, where the average line current circuit is operable to sense a voltage across at least a portion of the inductor, and determine the supply line current therefrom.

4. The power converter of claim 3, where the average line current circuit is operable to integrate the voltage sensed across the at least a portion of the inductor to determine a switch generated current, and the average line current circuit is further operable to integrate the switch generated current only during the time when the supply line current is being supplied to the single stage switching stage to determine the supply line current.

5. The power converter of claim 1, where the predetermined reflected voltage is a minimum alternating current line voltage, and the line current only flows when a peak of the alternating current line voltage is greater than the minimum alternating current line voltage.

6. The power converter of claim 1, where the controller is operable to control the wave shape of the supply line current suppliable to the single stage switching stage by variation of the switch generated voltage to create a fundamental voltage that is equal to or greater than the predetermined reflected voltage.

7. The power converter of claim 1, where the controller is operable to control the switch generated voltage to clip a peak of the supply line current suppliable to the single stage switching stage.

8. The power converter of claim 1, where the controller is further operable to control switching of the single stage switching stage to optimize a power factor by control of the shape of a waveform of the supply line current.

9. The power converter of claim 8, where the controller is further operable to control switching of the single stage switching stage to regulate an output voltage suppliable with the secondary winding.

10. A power converter comprising:
    a switching stage that includes a first set of switches and a second set of switches;
    a controller coupled with the switching stage, where the controller is operable to control switching of the first set of switches and the second set of switches to enable the output of a first time variable voltage from the first set of switches and a second time variable voltage from the second set of switches; and a transformer having a primary and a secondary, the transformer operable to receive a primary voltage representative of the combination of the first and second time variable voltages, where the controller is operable to control the primary voltage by variation of a relative phase difference between the first time variable voltage and the second time variable voltage based on a primary current suppliable to the transformer.

11. The power converter of claim 10, where the controller is operable to control the primary voltage to a conduction voltage of the transformer.

12. The power converter of claim 10, where the first set of switches comprises a first half bridge and the second set of switches comprises a second half bridge.

13. The power converter of claim 10, where an alternating current voltage is suppliable from a power supply line to the switching stage, and the first set of switches and the second set of switches are selectively controllable to conduct a line current suppliable from the power supply line only during a determined time within each half cycle of the alternating current voltage.

14. The power converter of claim 10, where the first set of switches and the second set of switches are exchangeable by the controller between operation in a leading mode and a lagging mode with respect to each other.

15. The power converter of claim 10, where the power converter is operable to supply power to a power supply rail of an audio amplifier.

16. The power converter of claim 10, where the controller is operable to control the primary voltage as a function of a primary current suppliable to the primary of the transformer and a load suppliable by the power converter.

17. The power converter of claim 10, further comprising an inductor, where the controller is operable to determine the primary current by integration of a voltage drop across the inductor.

18. The power converter of claim 17, where the controller is further operable to determine an average line current by integration of the primary current only during times when the first time variable voltage and the second time variable voltage have a relative phase difference.

19. A method of manufacture of a power converter, the method comprising:
providing a transformer having a primary winding and a secondary winding;
selecting a conduction voltage that is a lowest expected operating voltage;
designing a turns ratio of the primary winding and the secondary winding so that a reflected voltage of the secondary winding is about equal to the conduction voltage;
connecting an average line current circuit to measure a voltage across an inductor, where the measured voltage is useable to derive a supply line current that is shaped by a waveform of a primary voltage suppliable to the primary winding; and
configuring a plurality of switch position scenarios of a first set of switches and a second set of switches that are switchable to control the primary voltage to the selected conduction voltage so that the supply line current only flows to the primary winding during some of the switch position scenarios.

20. The method of claim 19, where configuring a plurality of switch position scenarios comprises configuring at least one first switch position scenario to allow the supply line current to flow to the primary winding and configuring at least one second switch position scenario to allow current to flow from one of the first or second set of switches to the other of the first or second set of switches.

21. The method of claim 19, further comprising combining a first voltage output of the first set of switches with a second voltage output of the second set of switches so that a relative phase difference between the first voltage output and the second voltage output is controllable to control the primary voltage to the selected conduction voltage.

22. The method of claim 19, where connecting an average line current circuit comprises configuring the average line circuit to perform integration of the measured voltage across the inductor to derive an inductor current, and to perform integration of the inductor current to derive the supply line current.

23. The method of claim 22, where configuring the average line circuit to perform integration of the inductor current comprises limiting the performance of the integration to only when the supply line current flows to the primary winding.

24. The method of claim 19, where providing a transformer comprises winding the transformer as a parallel interleave wound transformer to lower leakage flux.

25. A method of converting power with a power converter, the method comprising:
providing a supply line voltage and a supply line current to a first set of switches and a second set of switches;
switching the first set of switches with a controller to control a first voltage output of the first set of switches and to selectively conduct the supply line current through a switch included in the first set of switches;
switching the second set of switches with the controller to control a second voltage output of the second set of switches and to selectively conduct the supply line current through a switch included in the second set of switches;
combining the first voltage output with the second voltage output to form a primary voltage that is provided to a transformer having a predetermined conduction voltage;
calculating a magnitude of the supply line current supplied to the power converter as a function of a voltage across an inductor and a period of time when the supply line current is conducted through the first set of switches and the second set of switches; and
varying the relative phase of the first voltage output with respect to the second voltage output to control the primary voltage to the predetermined conduction voltage as a function of the calculated magnitude of the supply line current.

26. The method of claim 25, where calculating a magnitude of the supply line current comprises measuring a voltage across a winding of the inductor.

27. The method of claim 26, where calculating a magnitude of the supply line current comprises integrating the measured voltage over time to obtain an inductor current.

28. The method of claim 27, where calculating a magnitude of the supply line current comprises integrating the inductor current over the time when the supply line current is being conducted through a switch in each of the first set of switches and the second set of switches to obtain the supply line current.

29. The method of claim 25, where varying the relative phase comprises adjusting a duty cycle of the first and second sets of switches to be more or less overlapped.

30. The method of claim 25, where the supply line voltage is an alternating current voltage and switching the first and second sets of switches comprises providing a current path for the supply line current through the first and second sets of switches during only a portion of each half cycle of the supply line voltage.

31. The method of claim 25, where switching the first and second sets of switches comprises conducting the supply line current to the transformer with the first and second sets of switches at a time other than a peak in a waveform of the supply line voltage.

32. The method of claim 25, where the supply line current is conducted through the first set of switches and the second set of switches when a switch is closed in both of the first set of switches and the second set of switches.

33. A power converter comprising:
a first set of switches coupled in parallel with a second set of switches, and configured to be coupled in parallel with a source of line voltage and line current; and
a controller coupled with the first and second sets of switches, where the controller is operable to output a first control signal to control the relative phase of a first voltage output from the first set of switches, and output a second control signal to control the relative phase of a second voltage output from the second set of switches such that the first voltage output is selectively lagging with respect to the second voltage output;
where the controller is operable to exchange the first control signal with the second control signal so that the second voltage output of the second set of switches becomes selectively lagging with respect to the first voltage output of the first set of switches.

34. The power converter of claim 33, where the controller is further operable to exchange the first control signal and the second control signal in response to a predetermined event.

35. The power converter of claim 33, where the controller is further operable to exchange the first control signal and the second control signal in response to a temperature of at least one switch included in the first set of switches or the second set of switches.

36. The power converter of claim 33, where the line voltage is an alternating current line voltage, and where the controller is further operable to exchange the first control signal and the second control signal in response to completion of a half cycle of the alternating current line voltage.

37. The power converter of claim 33, where the controller is further operable to exchange the first control signal and the second control signal when current being conducted by the power converter is at or below a predetermined level.

38. The power converter of claim 33, where the controller is further operable to exchange the first control signal and the second control signal when at least one of the line voltage or the line current, or the combination thereof, are in an exchange opportunity window.

39. The power converter of claim 33, where the controller comprises a detector to detect a determined condition, a register, and an exchange circuit, where the exchange circuit is operable to exchange the first and second control signals in response to an update to the register.

40. A method of controlling a power converter, the method comprising:
switching a first set of switches with a first switching signal to control a first voltage output with the first set of switches;
switching a second set of switches with a second switching signal to control a second voltage output with the second set of switches;
selectively adjusting a relative phase of the first voltage with respect to the second voltage so that the first voltage lags the second voltage; and
exchanging the first switching signal with the second switching signal so that the second voltage lags the first voltage.

41. The method of claim 40, where exchanging comprises switching the first set of switches with the second switching signal and switching the second set of switches with the first switching signal.

42. The method of claim 40, where selectively adjusting a relative phase comprises controlling the relative phase so that a differential voltage of the first and second voltage outputs will be controlled to a predetermined fundamental voltage.

43. The method of claim 40, where selectively adjusting a relative phase comprises monitoring a supply line current and adjusting the relative phase based on the monitored supply line current.

44. The method of claim 40, where exchanging the first switching signal with the second switching signal comprises exchanging the first switching signal with the second switching signal in responses to a predetermined event.

* * * * *